United States Patent
Kurihara et al.

(10) Patent No.: US 9,037,888 B2
(45) Date of Patent: May 19, 2015

(54) MULTI-CORE PROCESSOR SYSTEM, ELECTRICAL POWER CONTROL METHOD, AND COMPUTER PRODUCT FOR MIGRATING PROCESS FROM ONE CORE TO ANOTHER

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Kazumi Miyako, Edogawa (JP)

(73) Assignee: FUJITSU LIMITED, Kawasaki (JP)

( * ) Notice: Subject to any disclaimer, the term of this patent is extended or adjusted under 35 U.S.C. 154(b) by 247 days.

(21) Appl. No.: 13/630,526

(22) Filed: Sep. 28, 2012

(65) Prior Publication Data
US 2013/0031391 A1    Jan. 31, 2013

Related U.S. Application Data

(63) Continuation of application No. PCT/JP2010/055966, filed on Mar. 31, 2010.

(51) Int. Cl.
*G06F 1/32* (2006.01)
*G06F 9/50* (2006.01)

(52) U.S. Cl.
CPC ............ *G06F 9/5044* (2013.01); *G06F 9/5094* (2013.01)

(58) Field of Classification Search
CPC ................................ G06F 1/329; G06F 9/5094
USPC .......................................... 713/320; 718/104
See application file for complete search history.

(56) References Cited

U.S. PATENT DOCUMENTS

| 6,006,248 A | 12/1999 | Nagae |
| 7,093,147 B2 * | 8/2006 | Farkas et al. ................... 713/320 |
| 2004/0187126 A1 | 9/2004 | Yoshimura |

(Continued)

FOREIGN PATENT DOCUMENTS

| CN | 1906587 | 1/2007 |
| JP | 9-185589 | 7/1997 |

(Continued)

OTHER PUBLICATIONS

Extended European Search Report dated Jul. 14, 2014 in corresponding European Patent Application No. 10848962.6.
"Energy Efficient Scheduling of Real-Time Tasks on Multicore Processors", Seo et al., IEEE Transactions on Parallel and Distributed Systems, vol. 19, No. 11, Nov. 2008, pp. 1540-1552.
"Leakage-Aware Energy-Efficient Scheduling of Real-Time Tasks in Multiprocessor Systems", Chen et al., Proceedings of the Twelfth IEEE Real-Time and Embedded Technology and Applications Symposium, 2006, 10pp.

(Continued)

*Primary Examiner* — Albert Wang
(74) *Attorney, Agent, or Firm* — Staas & Halsey LLP

(57) ABSTRACT

A multi-core processor system includes a core configured to detect that among cores different from a specific core executing a specific process, a given software different from specific software having a function equivalent to the specific process, is under execution; extract, from a database storing required computing capacities for the plural software and upon detecting that a given software is under execution, requirement values indicating the required computing capacity of the specific software and of the given software; judge for each the cores, whether a sum of the required computing capacities of the specific software and the software is at most a computing capacity value of the core; assign the specific software to a core for which the sum of the required computing capacities is judged to be at most the computing capacity value of the core; and suspend the specific core, upon assigning the specific software to the core.

5 Claims, 18 Drawing Sheets

(56) References Cited

U.S. PATENT DOCUMENTS

| | | |
|---|---|---|
| 2004/0205759 A1 | 10/2004 | Oka |
| 2005/0050373 A1 | 3/2005 | Orenstien et al. |
| 2005/0228967 A1 | 10/2005 | Hirairi |
| 2006/0259799 A1 | 11/2006 | Melpignano et al. |
| 2008/0263324 A1 | 10/2008 | Sutardja et al. |
| 2008/0270767 A1 | 10/2008 | Sonobe et al. |
| 2010/0318827 A1* | 12/2010 | Shah et al. .................... 713/324 |

FOREIGN PATENT DOCUMENTS

| | | |
|---|---|---|
| JP | 9-274608 | 10/1997 |
| JP | 10-78937 | 3/1998 |
| JP | 11-202988 | 7/1999 |
| JP | 2000-137692 | 5/2000 |
| JP | 2004-126968 | 4/2004 |
| JP | 2004-252900 | 9/2004 |
| JP | 2005-267635 | 9/2005 |
| JP | 2008-191949 | 8/2008 |
| JP | 2008-276395 | 11/2008 |
| JP | 2009-175850 | 8/2009 |
| WO | 2005/088443 | 9/2005 |

OTHER PUBLICATIONS

International Search Report of Corresponding PCT Application PCT/JP2010/055966 mailed Jun. 15, 2010.

"NEC, Panasonic, Fujitsu adopted OMAP of TI", 2010, ITmedia Inc., pp. 1-3, Retrieved from <http://plusd.itmedia.co.jp/mobile/0203/18/n_omap.html>.

"Action 44 Japanese semiconductor is revived by the mobile phone?", Massa POP Izumida, Jan. 23, 2004, pp. 1-7, Retrieved from <http://www.atmarkit.co.jp/fsys/zunouhoudan/044zunou/app_processor.html>.

"Action 20 Hitachi changes mobile phone with S-MAP?", Massa POP Izumida, Jan. 25, 2002, pp. 1-7, Retrieved from <http://www.atmarkit.co.jp/fpc/rensai/zunouhoudan020/smap.html>.

Japanese International Preliminary Report on Patentability for PCT/JP2010/0055966, mailed on Nov. 1, 2012, 12 pages.

Chinese Office Action issued Sep. 28, 2014 in corresponding Chinese Patent Application No. 201080065829.

Japanese Office Action dated Jan. 20, 2015 in corresponding Japanese Patent Application No. 2014-021654.

* cited by examiner

FIG.7

| SOFTWARE NAME | REQUIRED COMPUTING CAPACITY [MIPS] |
|---|---|
| STREAMING REPRODUCTION | 100 |
| SOUND REPRODUCTION | 40 |
| DRAWING MAP | 110 |
| PCM CODEC | 60 |

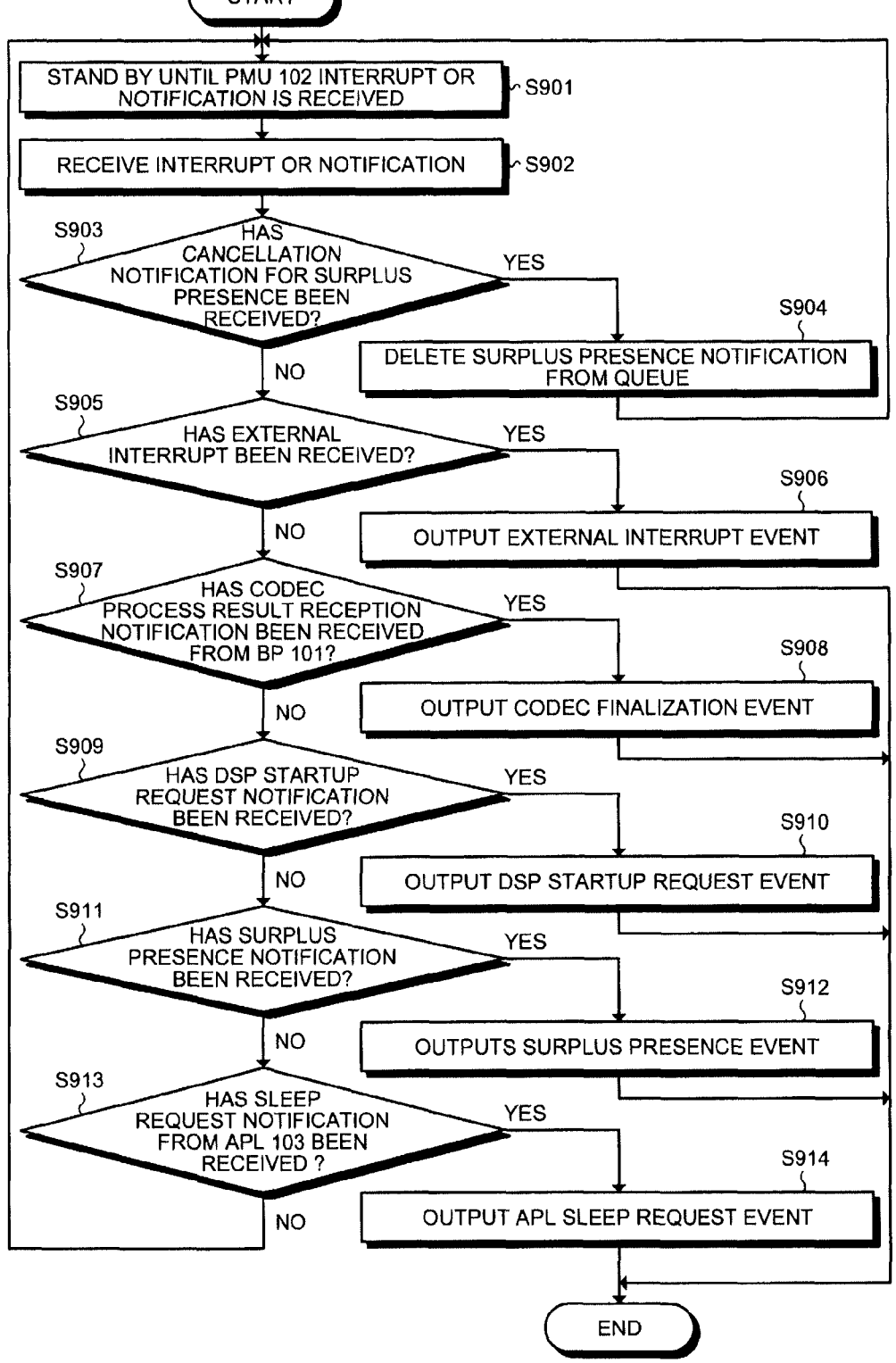

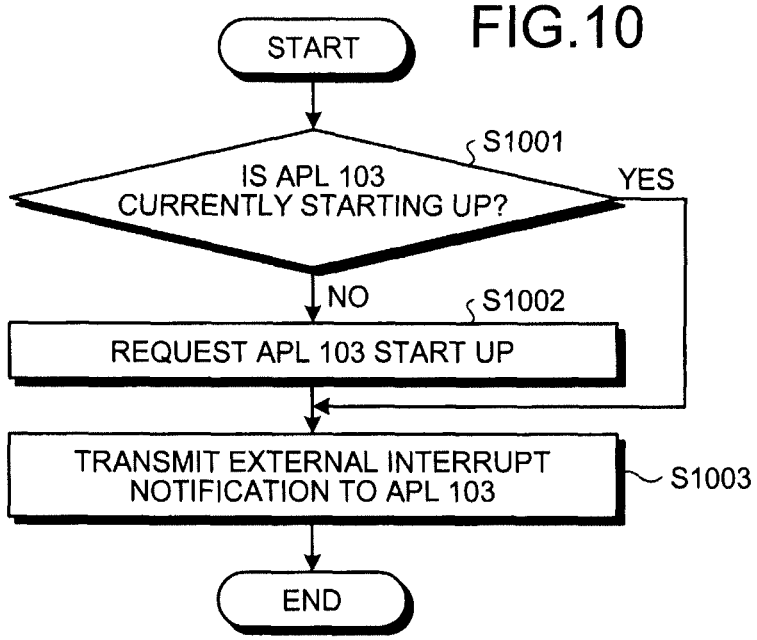
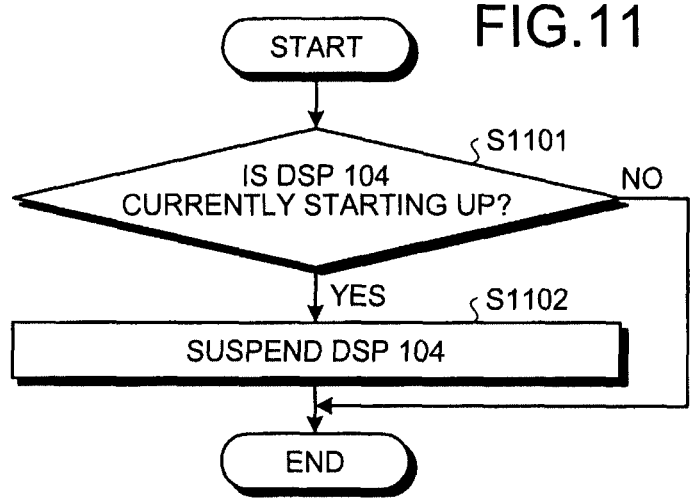

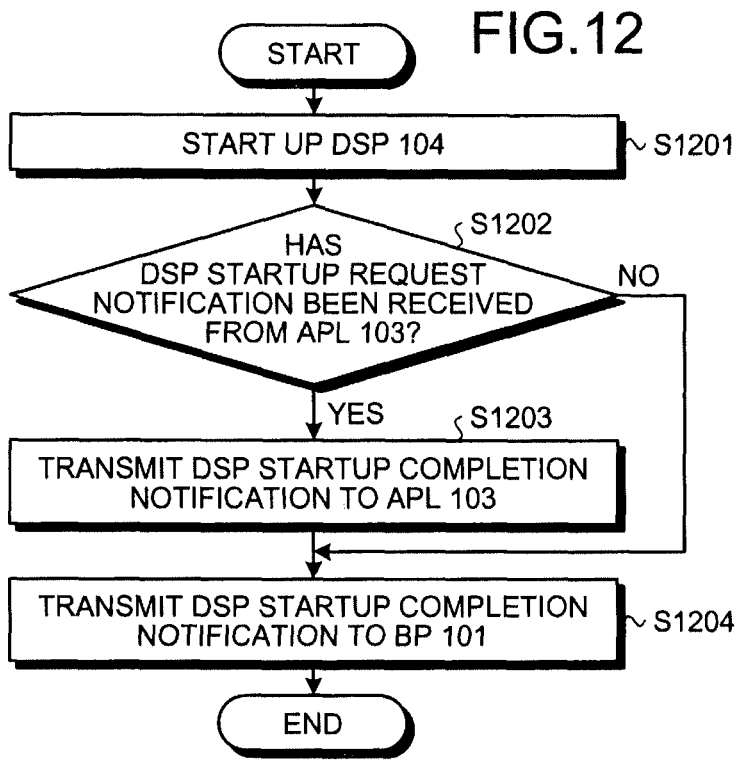
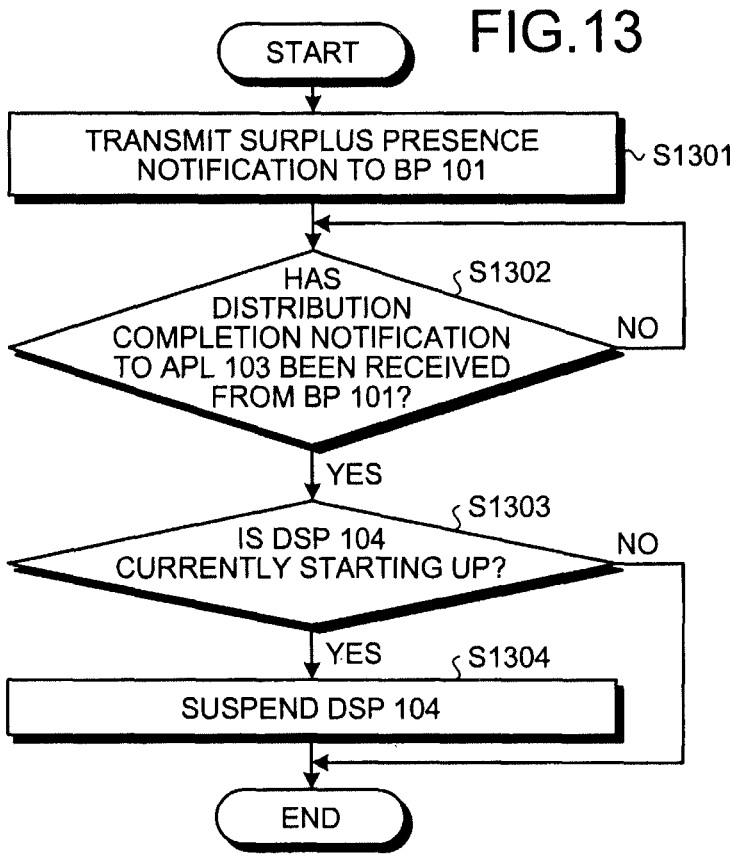

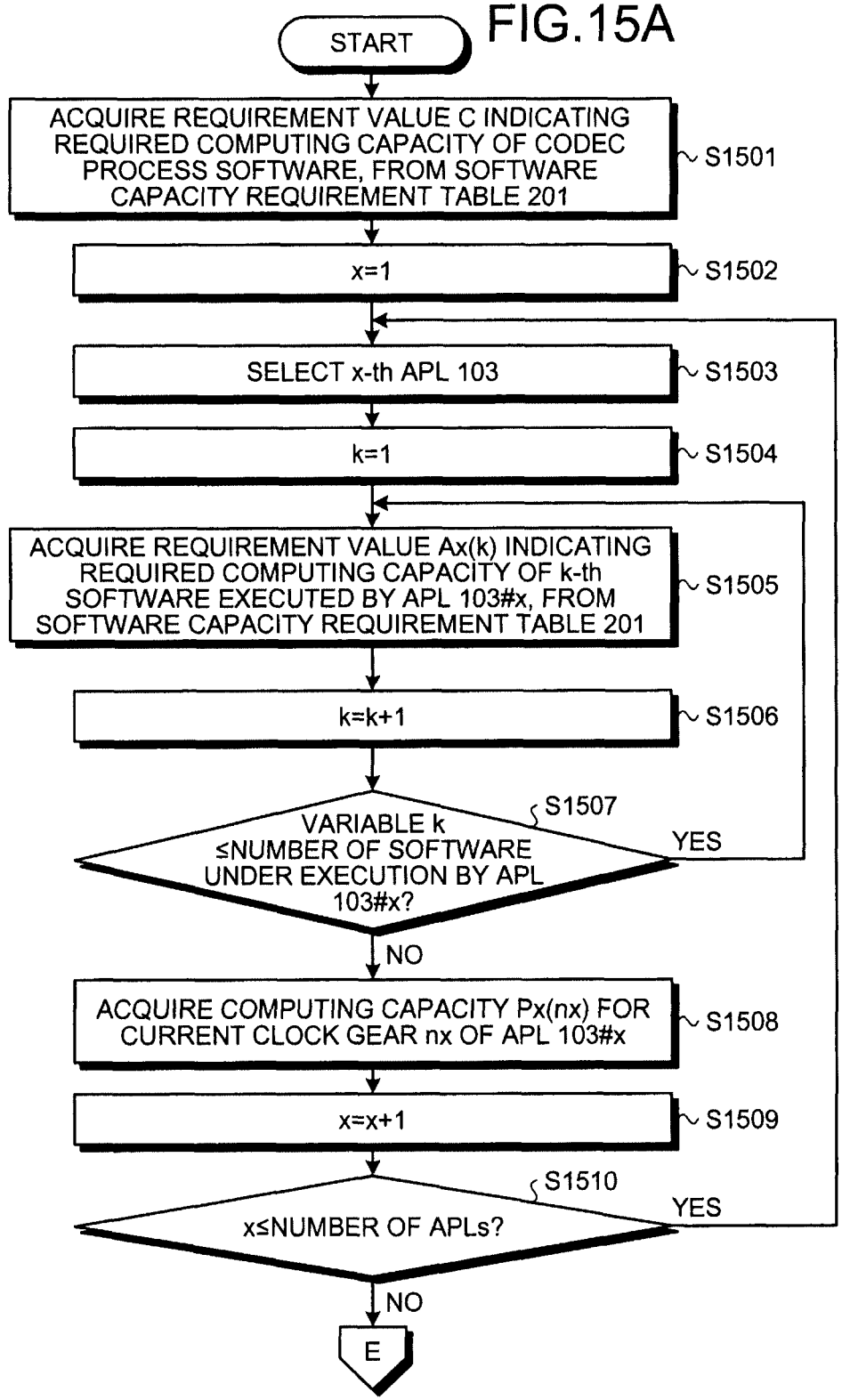

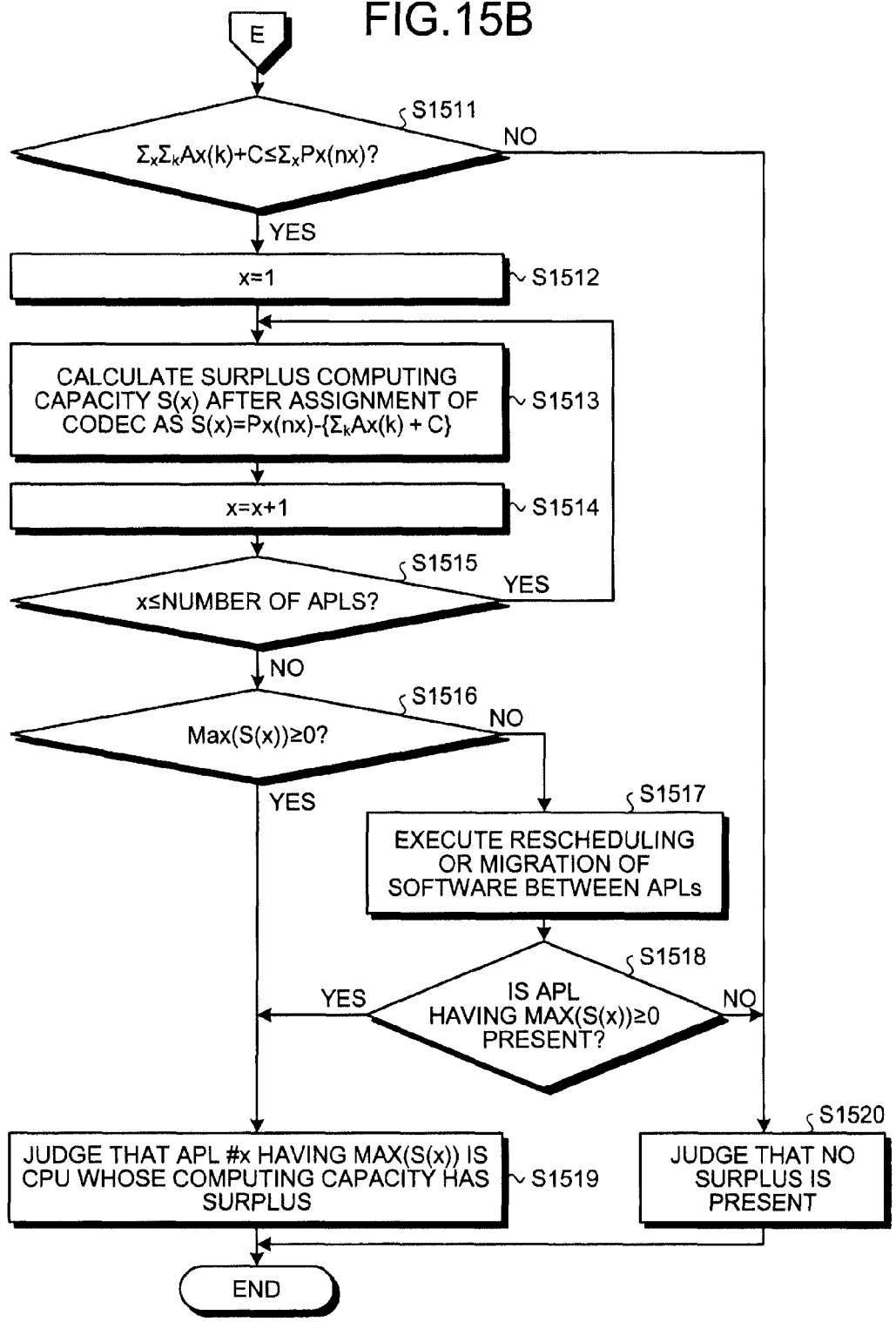

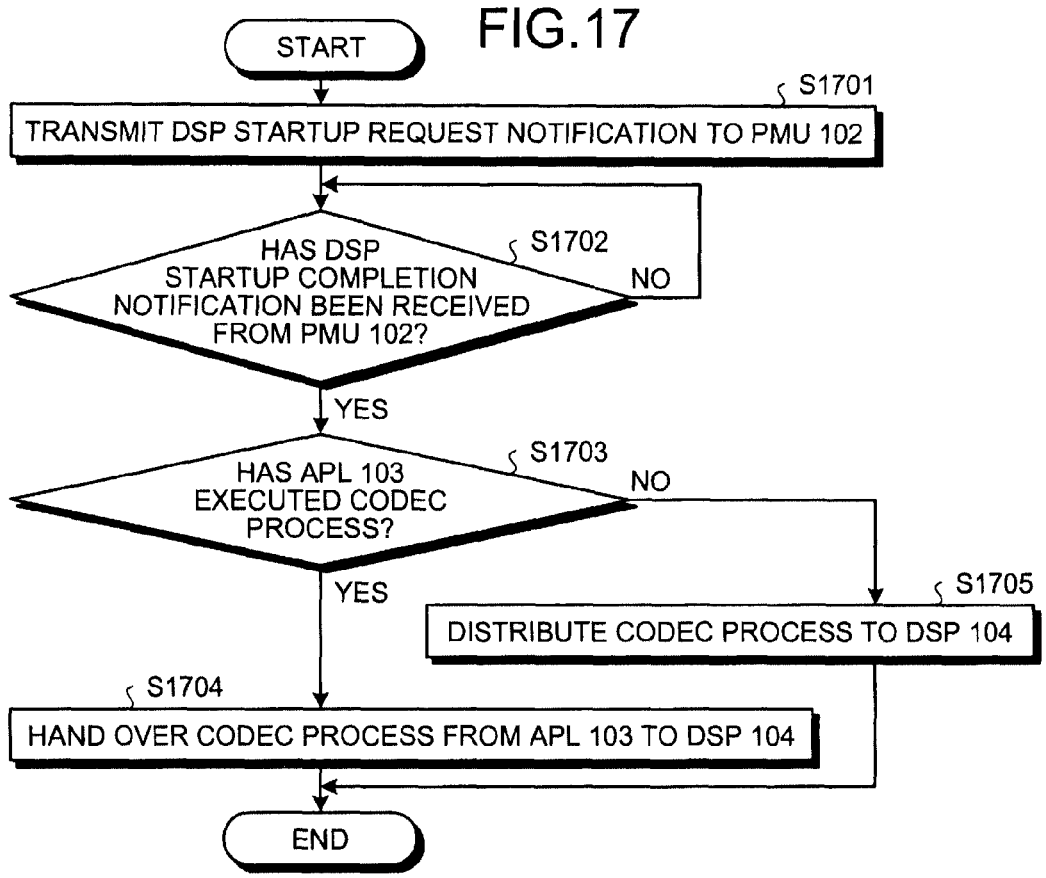
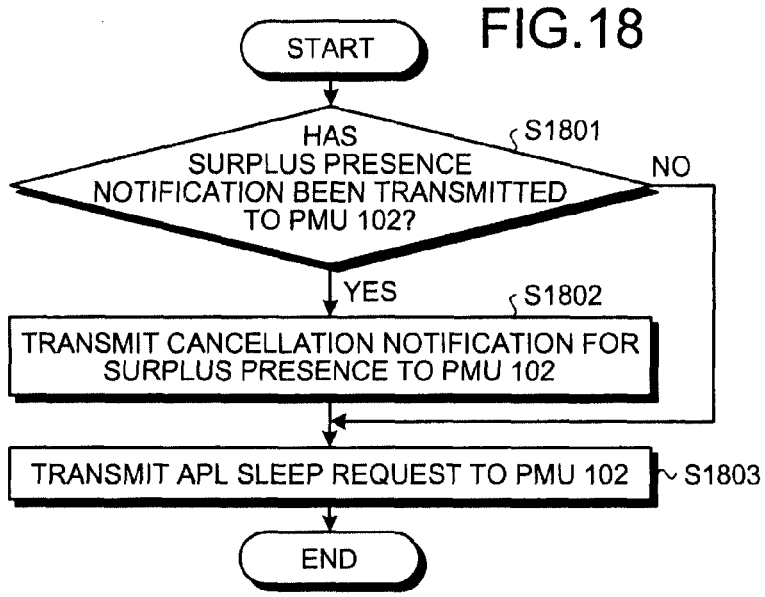

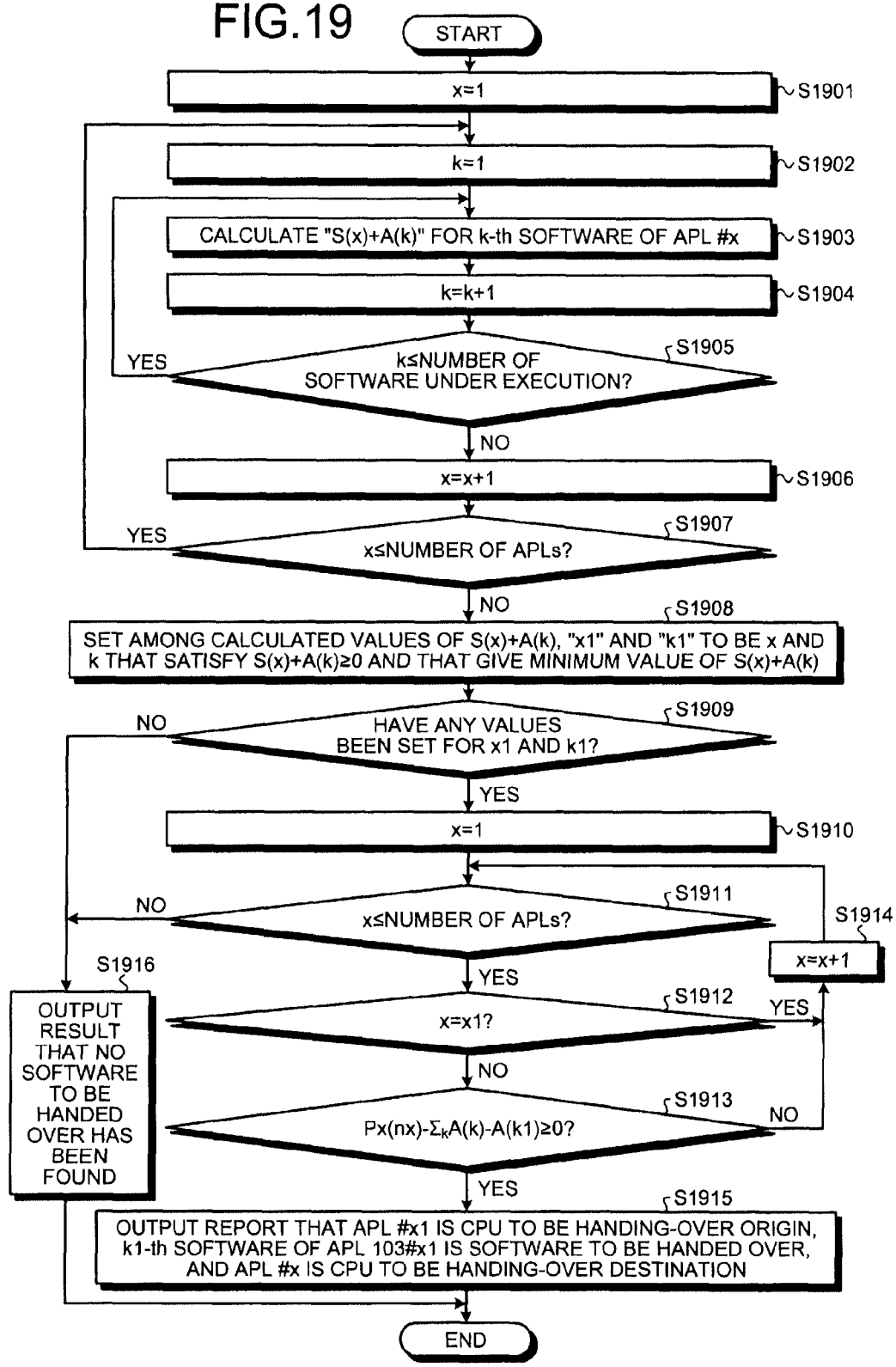

MULTI-CORE PROCESSOR SYSTEM, ELECTRICAL POWER CONTROL METHOD, AND COMPUTER PRODUCT FOR MIGRATING PROCESS FROM ONE CORE TO ANOTHER

CROSS REFERENCE TO RELATED APPLICATIONS

This application is a continuation application of International Application PCT/JP2010/055966, filed on Mar. 31, 2010 and designating the U.S., the entire contents of which are incorporated herein by reference.

FIELD

The embodiment discussed herein is related to a multi-core processor system, an electrical power control method, and an electrical power control program that control power.

BACKGROUND

In a conventional portable telephone, a baseband processor (hereinafter, "BP") is in charge of a communication and call functions; and an application processor (hereinafter, "APL") is in charge of the other multi-media processes. The BP further causes a digital signal processor (DSP) to execute a sound codec process of encoding and decoding the sound used by the call function (see, e.g.: "Zuno-Hodan (Brain Free Talk), No. 20, Will Hitachi change portable telephones using S-MAP? [online]", [retrieved on Mar. 18, 2010], the Internet <http://www.atmarkit.co.jp/fpc/rensai/zunouhoudan020/smap.html>; @IT, "Zuno-Hodan, No. 44, Semiconductor of Japan—Is a portable telephone a trigger for its revitalization? [online]" [retrieved on Mar. 18, 2010], the Internet <http://www.atmarkit.co.jp/fsys/zunouhoudan/044zunou/app_processor.html>; and Mobile, "OMAP" of TI—Employed by NEC, Matsushita, and Fujitsu for 3G portable telephones [online]", [retrieved on Mar. 18, 2010], the Internet <http://plusd.itmedia.co.jp/mobile/0203/18/n_omap.html>). The DSP is a processor that is developed aiming at executing a specific computing process at a high speed and that is used to mainly execute sound processing, image processing, etc. In this manner, the processor controlling the portable telephone is a heterogeneous multi-core processor system that includes processors executing processes each different from each other such as the BP, the APL, and the DSP.

A technique is disclosed as a technique of saving electrical power of a heterogeneous multi-core processor system, according to which the electrical power saving is facilitated by selecting a central processing unit (CPU) to which a program is assigned based on whether the processor is driven by an external power source or a battery from a dedicated CPU and a general-purpose CPU (see, e.g., Japanese Laid-Open Patent Publication No. 2008-276395).

Because the APL is in charge of the high-load multi-media processes, its computing capacity significantly varies depending on the multi-media process that the APL is executing. Therefore, the APL may include a clock gear function as a function of varying clock frequency. The clock gear function is a function that is able to cause the frequency to vary stepwise. The clock gear function included in the APL often is able to vary the frequency at three to five levels. In this manner, the APL is able to facilitate electrical power saving by varying a clock gear according to the multi-media process that the APL is executing.

However, among the conventional techniques, in the technique according to the above Japanese Laid-Open Patent Publication No. 2008-276395, the CPU to which the program is assigned is selected depending on whether the power source is an external power source or a battery. When a battery is used, a low-performance CPU is selected that presents an electrical power saving state and therefore, a problem arises in that the speed to execute a program is always low even when the battery has sufficient electrical power. Even when the electrical power is saved using the clock gear function, the number of levels set using the clock gear is small and therefore, a difference is generated for the multi-media process under execution between the proper computing capacity and the computing capacity of the APL. Therefore, a problem arises in that a surplus of the computing capacity is generated.

SUMMARY

According to an aspect of an embodiment, a multi-core processor system comprising a core configured to detect that among second cores different from a first core executing a first process, a second software that is among plural software and has a function that is different from a first software that is among the plural software and has a function equivalent to the first process, is under execution; extract, from a database storing required computing capacities respectively corresponding to each of the plural software and upon detecting that a second software is under execution, requirement values indicating the required computing capacity of the first software and of each second software; judge for each of the second cores, whether a sum of the required computing capacity of the first software and of the second software that is under execution by the second core is at most a computing capacity value of the second core; assign the first software to a second core for which the sum of the required computing capacities is judged to be at most the computing capacity value; and suspend the first core, upon assigning the first software to the second core.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is an explanatory diagram of an example of the content of a software capacity requirement table 201;

FIG. 9 is a flowchart of a PMU event acquisition process;

FIG. 10 is a flowchart of an external interrupt detection process;

FIG. 11 is a flowchart of a codec finalization e process;

FIG. 12 is a flowchart of a DSP startup request process;

FIG. 13 is a flowchart of a surplus presence process;

FIGS. 15A and 15B are flowcharts of the surplus judgment process in a case where multiple APLs 103 are present;

FIG. 17 is a flowchart of a DSP codec process;

FIG. 18 is a flowchart of an external interrupt ending process; and

FIG. 19 is a flowchart of an example of a process of searching software to be migrated.

DESCRIPTION OF EMBODIMENTS

Preferred embodiments of the present invention will be explained with reference to the accompanying drawings.

Figure 1:
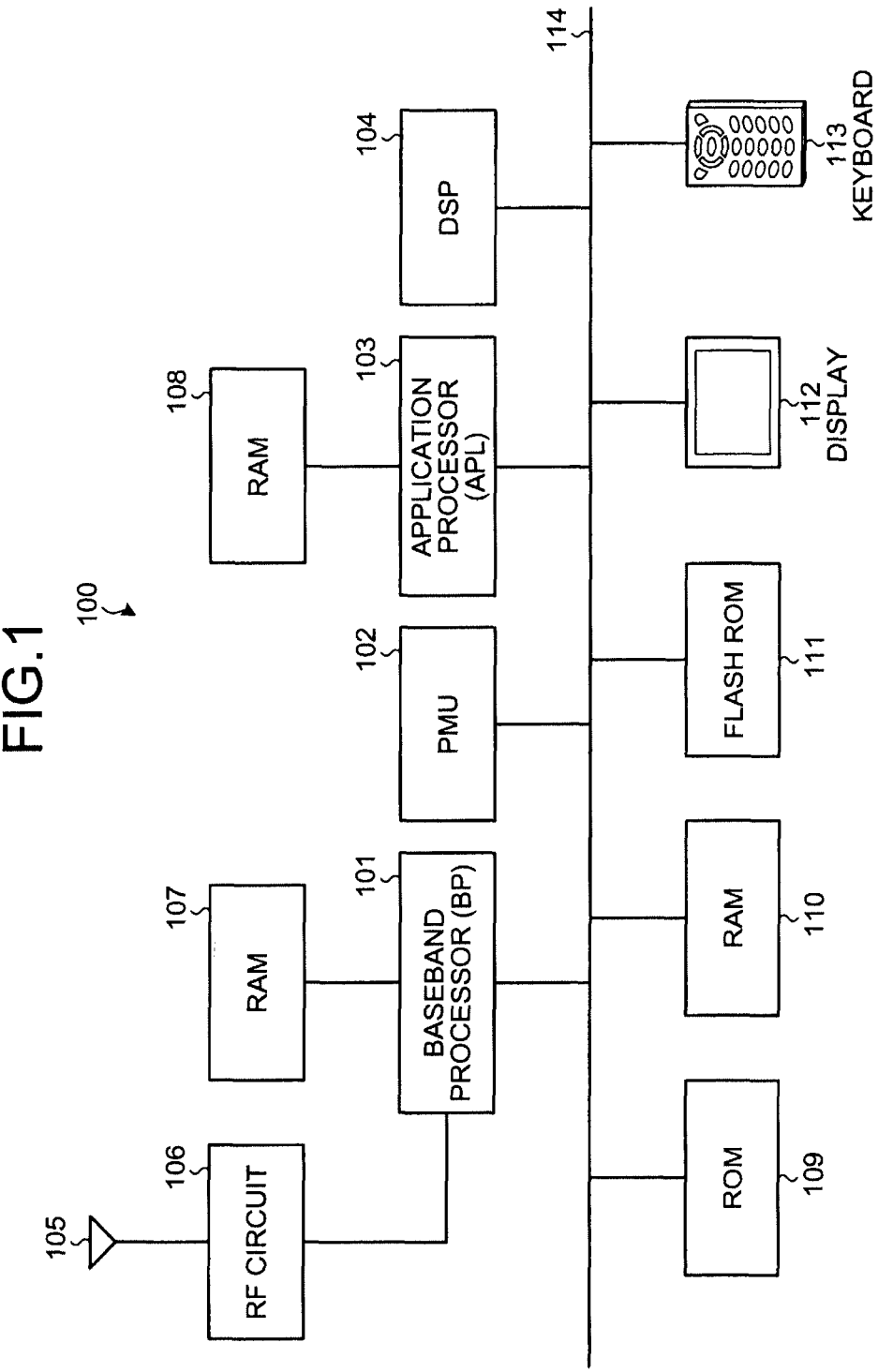
FIG. 1 is a block diagram of hardware of a multi-core processor system according to an embodiment.

FIG. 1 is a block diagram of hardware of the multi-core processor system according to the embodiment. In FIG. 1, the multi-core processor system 100 includes a baseband processor (BP) 101, a power management unit (PMU) 102, an application processor (APL) 103, and a DSP 104.

The "multi-core processor system" is a computer system that includes processors each having multiple cores. Provided multiple cores are provided, a single processor having multiple cores or a processor group of single-core processors connected in parallel may be used as the multi-core processor system. Preferably, the multi-core processor system 100 may be a heterogeneous multi-core processor system that includes multiple cores each having capacity different from that of each other.

The multi-core processor system 100 includes random access memory (RAM) 107 accessible by the BP 101 and RAM 108 accessible by the APL 103 as dedicated storage areas, and also includes read-only memory (ROM) 109, RAM 110, and flash ROM 111 as common storage areas. The multi-core processor system 100 further includes an antenna 105, an RF circuit 106, a display 112, and a keyboard 113 as inputting and outputting apparatuses for a user or other apparatuses. These components are connected to each other by a bus 114.

The BP 101 is a processor core that detects a call under the control of the RF circuit 106 and that is in charge of the communication and the call functions. The BP 101 according to the embodiment distributes a sound codec process to the APL 103 or the DSP 104 depending on whether the computing capacity of the APL 103 has a surplus. A PMU 102 is an apparatus that manages power consumption for each apparatus and, in the embodiment, causes the APL 103 and the DSP 104 to sleep.

The APL 103 is a processor core in charge of the multimedia processes. The APL 103 is also in charge of the sound codec process when the computing capacity of the APL 103 has a surplus. The APL 103 may have a clock gear function as a function to be able to vary the clock frequencies of the APL 103, the RAM 108, etc. The APL 103 is able to achieve an electrical power saving effect by switching among clock gears corresponding to the load of the software under execution thereby. For example, the APL 103 is able to change the clock gear at three to five levels. Specific examples of the clock frequency can be 100, 200, and 600 [MHz]. Examples of power consumption corresponding to these clock frequencies can be 100, 200, and 600 [mW].

The DSP 104 is a processor core in charge of the sound codec process. Pulse code modulation (PCM) and adaptive differential pulse code modulation (ADPCM) are present as formats of the sound codec process. Though no RAM dedicated to the DSP 104 is depicted, the DSP 104 may have a dedicated RAM. The multi-core processor system 100 may migrate the sound codec process from APL 103 to the DSP 104 in mid-course of the execution of the sound codec process, by accessing the RAM 108 by the APL 103. In such a case, the DSP 104 accesses the interim result of the sound codec process stored in the RAM 108 and therefore, the DSP 104 may be wired such that the DSP 104 is able to access the RAM 108.

The antenna 105 transmits and receives radio signals. The RF circuit 106 is a high-frequency processing unit, receives data from a network such as the Internet through the antenna 105, and transmits data to the network. In the embodiment, the RF circuit 106: includes an analog/digital (A/D) converter, a D/A converter, etc.; and converts data from the network into a digital signal, converts data from the BP 101 into an analog signal, etc.

The ROM 109 has programs such as a boot program stored therein. The RAM 110 is used as a working area for the BP 101, the PMU 102, the APL 103, and the DSP 104. The flash ROM 111 has system software such as an operating system (OS), application software, etc., stored therein.

The display 112 displays, for example, data such as text, images, functional information, etc., in addition to a cursor, icons, and/or tool boxes. A thin-film-transistor (TFT) liquid crystal display and the like may be employed as the display 112. The keyboard 113 includes, for example, keys for inputting letters, numerals, and various instructions and performs the input of data. Alternatively, a touch-panel-type input pad or numeric keypad, etc. may be adopted.

Figure 2:
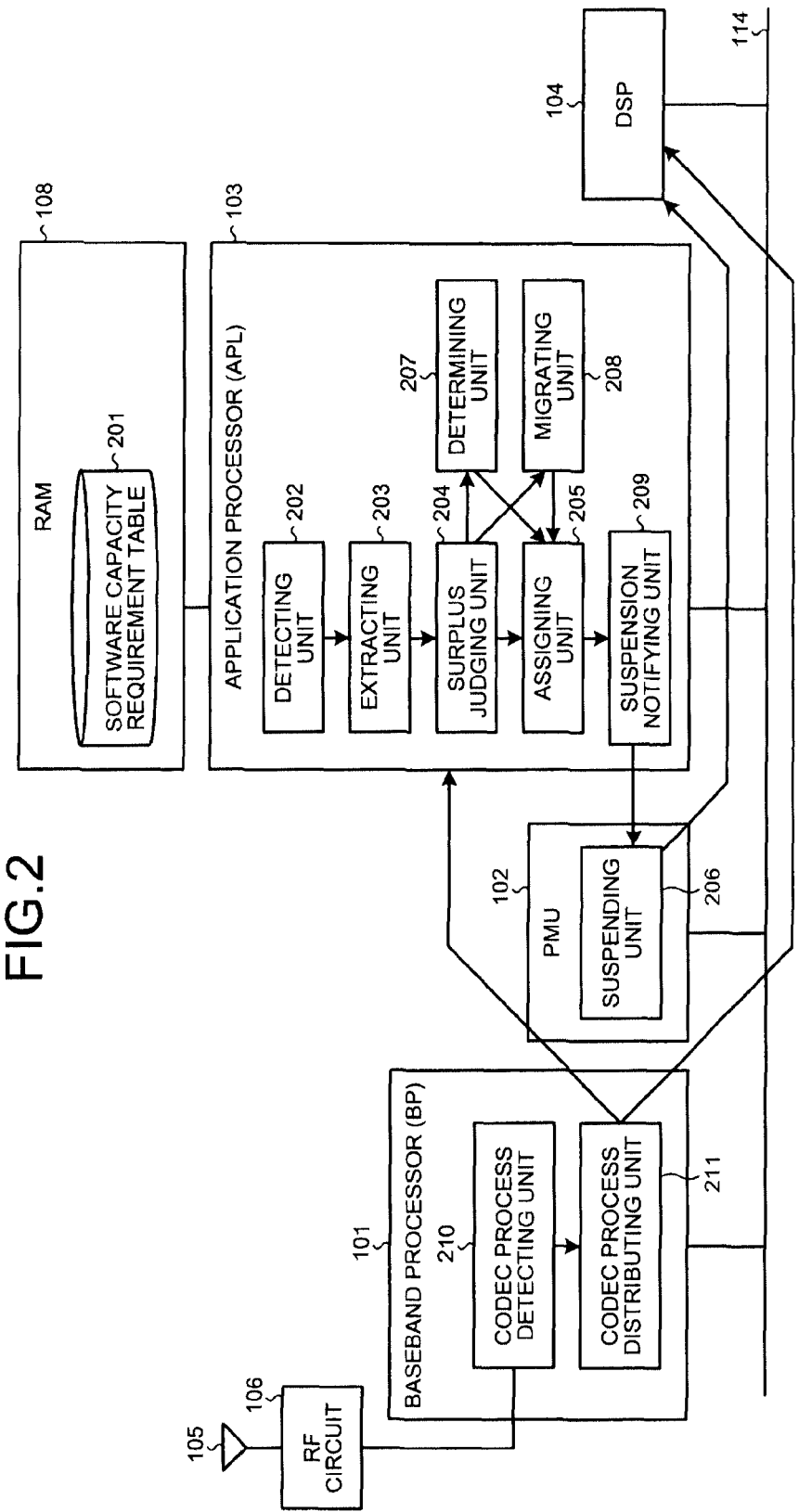
FIG. 2 is a block diagram of a multi-core processor system 100.

The multi-core processor system 100 will be described. FIG. 2 is a block diagram of the multi-core processor system 100. The multi-core processor system 100 includes a detecting unit 202, an extracting unit 203, a surplus judging unit 204, an assigning unit 205, a suspending unit 206, a determining unit 207, a migrating unit 208, a suspension notifying unit 209, a codec process detecting unit 210, and a codec process distributing unit 211. The functions (the detecting unit 202 to the codec process distributing unit 211) constitute a control unit and are implemented by executing on any one of the BP 101, the PMU 102, and the APL 103, programs stored in a storing apparatus. A storing apparatus is, for example, the RAMs 107, 108, and 110, the ROM 109, the flash ROM 111, etc.

The multi-core processor system 100 is able to access a software capacity requirement table 201. The software capacity requirement table 201 stores requirement values indicating the required computing capacity of each software among plural software. The APL 103 accesses the software capacity requirement table 201 and therefore, the software capacity requirement table 201 is stored in the RAM 108 in FIG. 2 while the table 201 may be stored in the RAM 110, etc.

Among the control units, the units from the detecting unit 202 to the assigning unit 205 and those from the determining unit 207 to the suspension notifying unit 209 are executed by the APL 103. The suspending unit 206 is executed by the PMU 102. The codec process detecting unit 210 and the codec process distributing unit 211 are executed by the BP 101.

The detecting unit 202 has a function of detecting that another core different from a specific core to execute specific software is executing software that is different from the specific software among the plural software. The specific software belongs to the plural software and has a function that is equivalent to a specific process. The "specific process" is, for example, the sound codec process. The "specific core" is the DSP 104. The "specific process" may be digital image processing that the DSP 104 is generally good at executing.

"The other core different from the specific core" is the APL 103. "The other software" may be any software other than the specific software executed by the APL 103. For example, the other software may be a streaming video image reproduction process that is a multi-media process other than the specific process. For example, when the other software is word-processor software that is business software, the software may execute a text editing process in addition to executing the multi-media processes.

The specific core and the other core may be CPUs each having performance different from that of each other. Though the APL 103 depicted in FIGS. 1 and 2 is one CPU, the APL 103 to execute the multi-media processes may include multiple CPUs. The "specific software having the function equivalent to the specific process" is, for example, codec process software that has the function equivalent to the codec process that the DSP 104 is in charge of.

For example, the detecting unit 202 detects that the DSP 104 currently executes the sound codec process and the APL 103 currently executes the other software that is different from the codec process software. Information concerning this detection is stored in a storage area such as the RAM 108 or 110.

The extracting unit 203 has a function of extracting the required computing capacities of the specific software and the other software from the software capacity requirement table 201 when the detecting unit 202 detects that the other core currently executes the other software. The "required computing capacity" is the computing capacity required for software to be run normally. The required computing capacity is measured in advance using a simulation conducted before the execution or a profiler. The APL 103 may take a record when the software is executed and may update the software capacity requirement table 201. For example, when the detecting unit 202 executes the detection, the extracting unit 203 extracts the required computing capacity of the specific software.

The values extracted are each represented in million instructions per second (MIPS) that expresses how many millions of instructions are able to be executed in one second. For example, the extracting unit 203 extracts 60 [MIPS] as the required computing capacity of the codec process software that is the specific software. Similarly, the extracting unit 203 extracts 100 [MIPS] as the required computing capacity of the streaming reproduction software as the other software, and 40 [MIPS] as the required computing capacity of sound reproduction software. Each required computing capacity extracted is stored in the storage area such as the RAM 108 or 110.

The surplus judging unit 204 has a function of judging if the sum of the required computing capacities of the specific software and the other software extracted by the extracting unit 203 is equal to or lower than the computing capacity value of the other core. The surplus judging unit 204 may judge, when the migrating unit 208 migrates software to be migrated, if the sum of the required computing capacities of the software remaining after excluding the software to be migrated of the core to be the migrating origin is equal to or lower than the computing capacity value of the core to be the migrating origin. The surplus judging unit 204 may judge if the sum of the requirement values is equal to or lower than the computing capacity value of the core to be the migrating origin, and if the sum of the required computing capacities of the specific software and a software group under execution by the other cores is equal to or lower than the sum of the computing capacity values of the other cores.

For example, it is assumed that the required computing capacity of the specific software is 60 [MIPS]; the required computing capacities of other software are 100 and 40 [MIPS]; and the computing capacity value of the APL 103 is 200 [MIPS]. Because 60+100+40≤200, the surplus judging unit 204 judges that the sum of the required computing capacities is equal to or lower than the computing capacity value of the APL 103. The information concerning the result of the judgment is stored in the storage area such as the RAM 108 or 110.

The assigning unit 205 has a function of assigning the specific software to the other core when the surplus judging unit 204 judges that the sum of the requirement values is equal to or lower than the computing capacity value of the other core. The assigning unit 205 may assign the specific software to the core determined by the determining unit 207. For example, if the surplus judging unit 204 judges that the sum of the requirement values is equal to or lower than the computing capacity value of the APL 103, the assigning unit 205 assigns the codec process software to the APL 103. The result of the assignment is stored in the storage area such as the RAM 108 or 110.

The suspending unit 206 has a function of receiving a notification from the suspension notifying unit 209 and suspending the specific core when the assigning unit 205 assigns the specific software to the other core. The suspending unit 206 may suspend the specific core when the assigning unit 205 assigns the specific software to the core determined by the determining unit 207. For example, when the codec process software is assigned to the APL 103, the PMU 102 suspends the DSP 104. The information concerning this suspending is stored in the storage area such as the RAM 110.

The determining unit 207 has a function of determining the core for which the difference of the computing capacity value there of and the sum of the required computing capacities of the specific software and the other software is greatest, among the other cores when the surplus judging unit 204 judges that the sum of the requirement values is equal to or lower than the computing capacity value of the other cores.

For example, the APL 103 includes three CPUs denoted by "APL 103#1" to "APL 103#3". When the computing capacity values of the APL 103#1 is 100 [MIPS] and the sum of requirement values is 70 [MIPS], the difference therebetween is 30 [MIPS]. Similarly, when the computing capacity value of the APL 103#2 is 200 [MIPS] and the sum of the requirement values is 120 [MIPS], the difference therebetween is 80 [MIPS]. Similarly, when the computing capacity value of the APL 103#3 is 600 [MIPS] and the sum of the requirement values is 580 [MIPS], the difference therebetween is 20 [MIPS].

In this case, the determining unit 207 determines that the APL 103#2 having the greatest difference among the APL 103#1 to APL 103#3 is the CPU to which the codec process software is to be assigned. The information concerning the CPU determined is stored in the storage area such as the RAM 108 or 110.

The migrating unit 208 has a function of migrating the software that is to be migrated to the core to be the migrating destination among the other cores, the software that is to be migrated and is under execution by the core to be the migrating origin among the other cores. The migrating unit 208 may migrate the software when the surplus judging unit 204 judges that the sum of the required computing capacities of the specific software and the software remaining after excluding the software to be migrated of the core to be the migrating origin is equal to or lower than the computing capacity value of the core to be the migrating origin.

For example, it is assumed that: the APL 103 includes two CPUs denoted by "APL 103#1" and "APL 103#2"; the APL 103#1 is the core to be the migrating origin; and the APL 103#2 is the core to be the migrating destination. When the required computing capacity of the software under execution by the APL 103#1 is 160 [MIPS] and that of the software to be migrated is 20 [MIPS], the sum of the required computing capacities of the software remaining is 160−20=140 [MIPS].

When the computing capacity value of the APL 103#1 is 200 [MIPS] and the required computing capacity of the specific software is 60 [MIPS], the sum is 140+60≤200 and the surplus judging unit 204 judges that the sum is equal to or lower than the computing capacity value of the core to be the migrating origin. Therefore, the migrating unit 208 migrates the software to be migrated to the APL 103#2. The information concerning the software to be migrated that is migrated may be stored in the storage area such as the RAM 108 or 110.

The suspension notifying unit 209 has a function of giving notification of a suspend request of the specific core when the assigning unit 205 assigns the specific software to the other core. For example, after the codec process software that is the specific software is assigned to the APL 103, the suspension notifying unit 209 notifies the PMU 102 of the suspend request of the DSP 104. The information concerning the suspend request may be stored in a storage area such as the RAM 108 or 110.

The codec process detecting unit 210 has a function of detecting whether a codec process occurs, based on the data input and output by the RF circuit 106. For example, when the BP 101 converts data input thereinto according to the protocol applied to the multi-core processor system 100 and, as a result, the format of the data input thereinto is PCM or ADPCM, the BP 101 detects that the codec process has occurred. The data detected is stored in the storage area such as the RAM 107 or 110.

The codec process distributing unit 211 has a function of distributing the codec process detected by the codec process detecting unit 210 to the APL 103 or the DSP 104, based on the surplus of the computing capacity of the APL 103. For example, when the computing capacity of the APL 103 has a surplus, the BP 101 distributes the codec process to the APL 103. When the computing capacity of the APL 103 has no surplus, the BP 101 distributes the codec process to the DSP 104. The information concerning which one of the APL 103 and the DSP 104 the codec process is distributed to is stored in the storage area such as the RAM 107 or 110.

Figure 3:
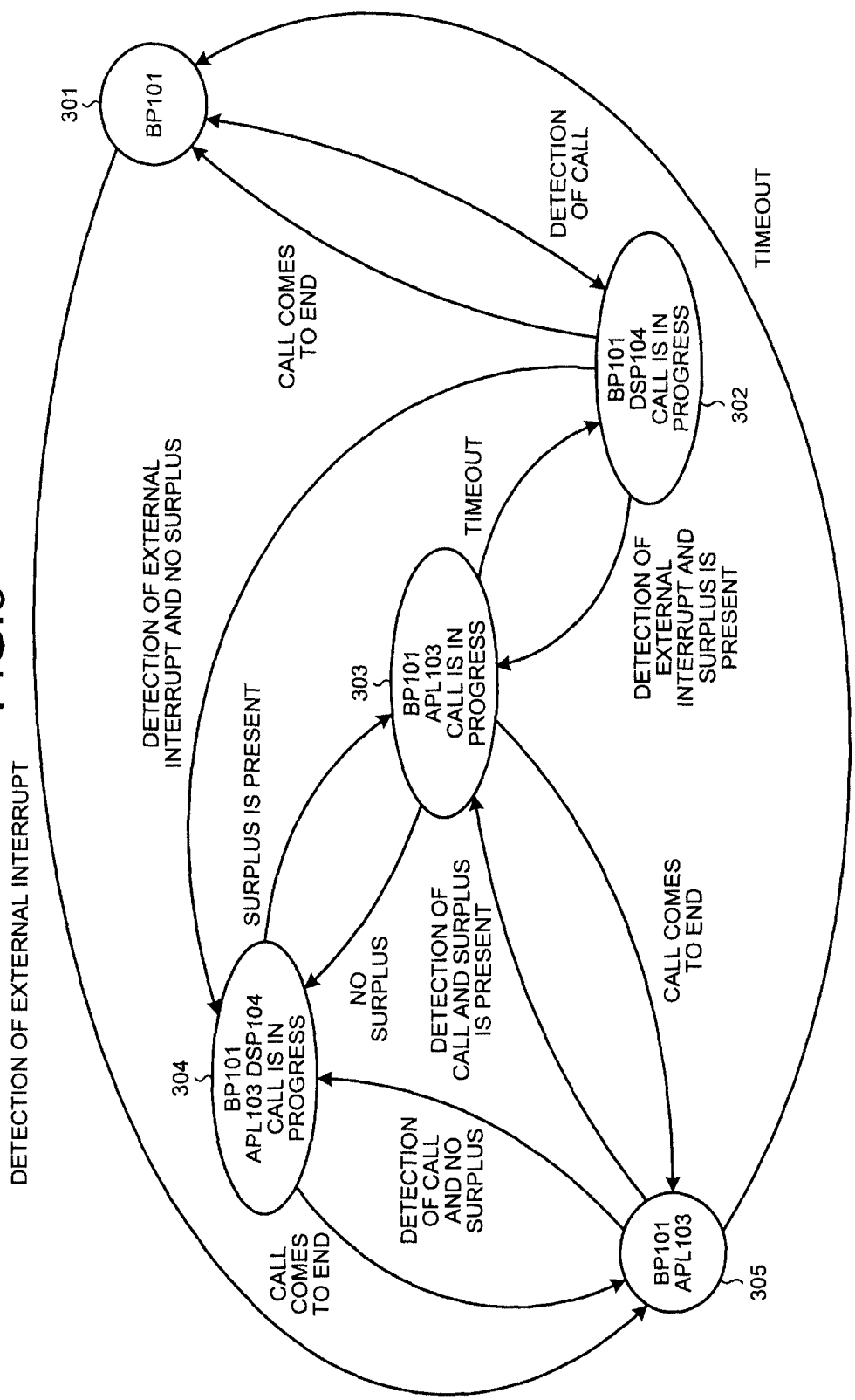
FIG. 3 is an explanatory diagram of transition of an execution state of each CPU of the multi-core processor system 100.

FIG. 3 is an explanatory diagram of transition of the execution state of each of the CPUs of the multi-core processor system 100. The state of the multi-core processor system 100 is any one of the following five states. A state 301 is the state where no call is in progress and only the BP 101 is executing. A state 302 is the state where a call is in progress and the BP 101 and the DSP 104 are executing. A state 303 is the state where a call is in progress and the BP 101 and the APL 103 are executing. A state 304 is the state where a call is in progress and the BP 101, the APL 103, and the DSP 104 are executing. A state 305 is the state where no call is in progress and the BP 101 and the APL 103 are executing.

When the state of the multi-core processor system 100 is the state 301 and the BP 101 detects a call, the PMU 102 causes the DSP 104 for executing the sound codec process to be activated from the suspended state. As a result, the state of the multi-core processor system 100 transitions from the state 301 to the state 302. When the state of the multi-core processor system 100 is the state 301 and the PMU 102 detects an external interrupt from the keyboard 113, the PMU 102 causes the APL 103 for executing the multi-media processes to be activated from the suspended state. As a result, the state of the multi-core processor system 100 transitions from the state 301 to the state 305.

When the state of the multi-core processor system 100 is the state 302 and the BP 101 detects that the call comes to an end, the PMU 102 suspends the DSP 104 executing the sound codec process. As a result, the state of the multi-core processor system 100 transitions from the state 302 to the state 301.

When the state of the multi-core processor system 100 is the state 302 and the PMU 102 detects an external interrupt from the keyboard 113, the PMU 102 causes the APL 103 for executing the multi-media processes to be activated from the suspended state. In addition, when the computing capacity of the APL 103 has a surplus, the PMU 102 migrates the codec process from the DSP 104 to the APL 103. As a result, the state of the multi-core processor system 100 transitions from the state 302 to the state 303. When the computing capacity of the APL 103 has no surplus, the DSP 104 continues to execute the codec process. As a result, the state of the multi-core processor system 100 transitions from the state 302 to the state 304.

When the state of the multi-core processor system 100 is the state 303 and a no-operation state thereof continues exceeding a specific time period and time-out occurs thereto, the APL 103 causes the multi-media processes to come to an end. Continuously, the PMU 102: causes the DSP 104 to be activated from the suspended state; thereafter, migrates the codec process from the APL 103 to the DSP 104; and, thereafter, suspends the APL 103. As a result, the state of the multi-core processor system 100 transitions from the state 303 to the state 302.

When: the state of the multi-core processor system 100 is the state 303; the PMU 102 detects a further external interrupt; the multi-media processes are increased: and thereby, the computing capacity of the APL 103 has no surplus, the PMU 102 causes the DSP 104 to be activated from the suspended state and migrates the codec process from the APL 103 to the DSP 104. As a result, the state of the multi-core processor system 100 transitions from the state 303 to the state 304. When the state of the multi-core processor system 100 is the state 303 and the BP 101 detects that the call comes to an end, the APL 103 causes the sound codec process to come to an end. As a result, the state of the multi-core processor system 100 transitions from the state 303 to the state 305.

When the state of the multi-core processor system 100 is the state 304, some of the multi-media processes come to an end, and the computing capacity of the APL 103 has a surplus, the PMU 102 migrates the codec process from the DSP 104 to the APL 103 and suspends the DSP 104. As a result, the state of the multi-core processor system 100 transitions from the state 304 to the state 303. When the state of the multi-core processor system 100 is the state 304 and the BP 101 detects that the call comes to an end, the PMU 102 suspends the DSP 104 executing the sound codec process. As a result, the state of the multi-core processor system 100 transitions from the state 304 to the state 305.

In a case where the state of the multi-core processor system 100 is the state 305 and the BP 101 detects a call, when the computing capacity of the APL 103 has a surplus, the APL 103 executes the codec process. As a result, the state of the multi-core processor system 100 transitions from the state 305 to the state 303. When the computing capacity of the APL 103 has no surplus, the PMU 102 reactivates the DSP 104 from the suspend state. As a result, the state of the multi-core processor system 100 transitions from the state 305 to the state 304.

In a case where the state of the multi-core processor system 100 is the state 305 and a no-operation state thereof continues exceeding the specific time period and time-out occurs thereto, the APL 103 causes the multi-media processes to come to an end. When all of the multi-media processes come to an end, the PMU 102 suspends the APL 103. As a result, the state of the multi-core processor system 100 transitions from the state 305 to the state 301.

Figure 4:
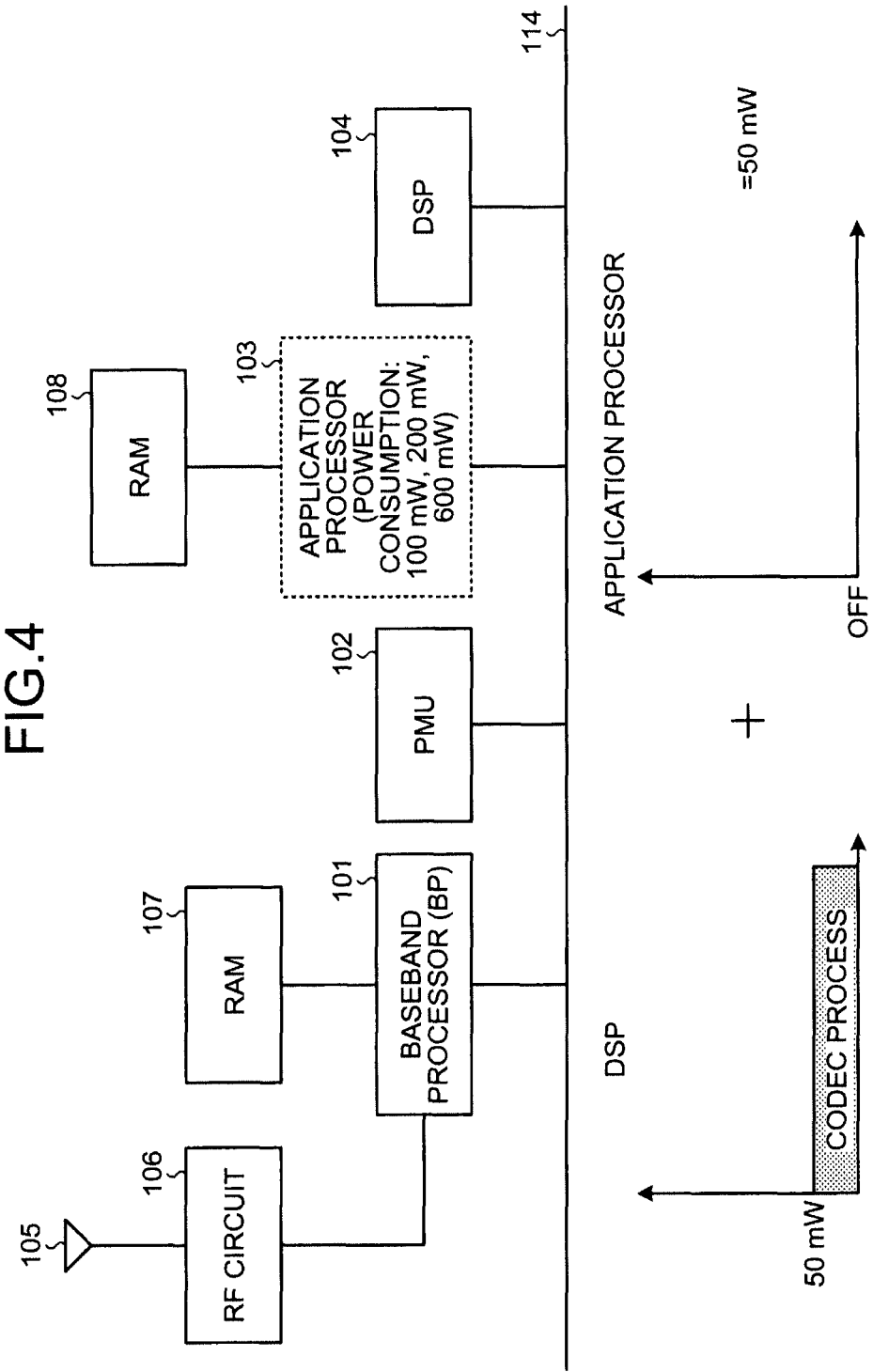
FIG. 4 is an explanatory diagram of the execution state and power consumption of each CPU in a state 302 depicted in FIG. 3.

FIG. 4 is an explanatory diagram of the execution state and the power consumption of each of the CPUs in the state 302. When the state of the multi-core processor system 100 is the state 302, the BP 101 and the DSP 104 are executing a call process. It is assumed that the power consumption of the DSP 104 is 50 [mW] and those of the APL 103 are 100, 200, and 600 [mW] in order of increasing clock gear thereof. The sum of the power consumption of the DSP 104 and that of the APL 103 in the state 302 of the multi-core processor system 100 is 50+0=50 [mW].

Figure 5:
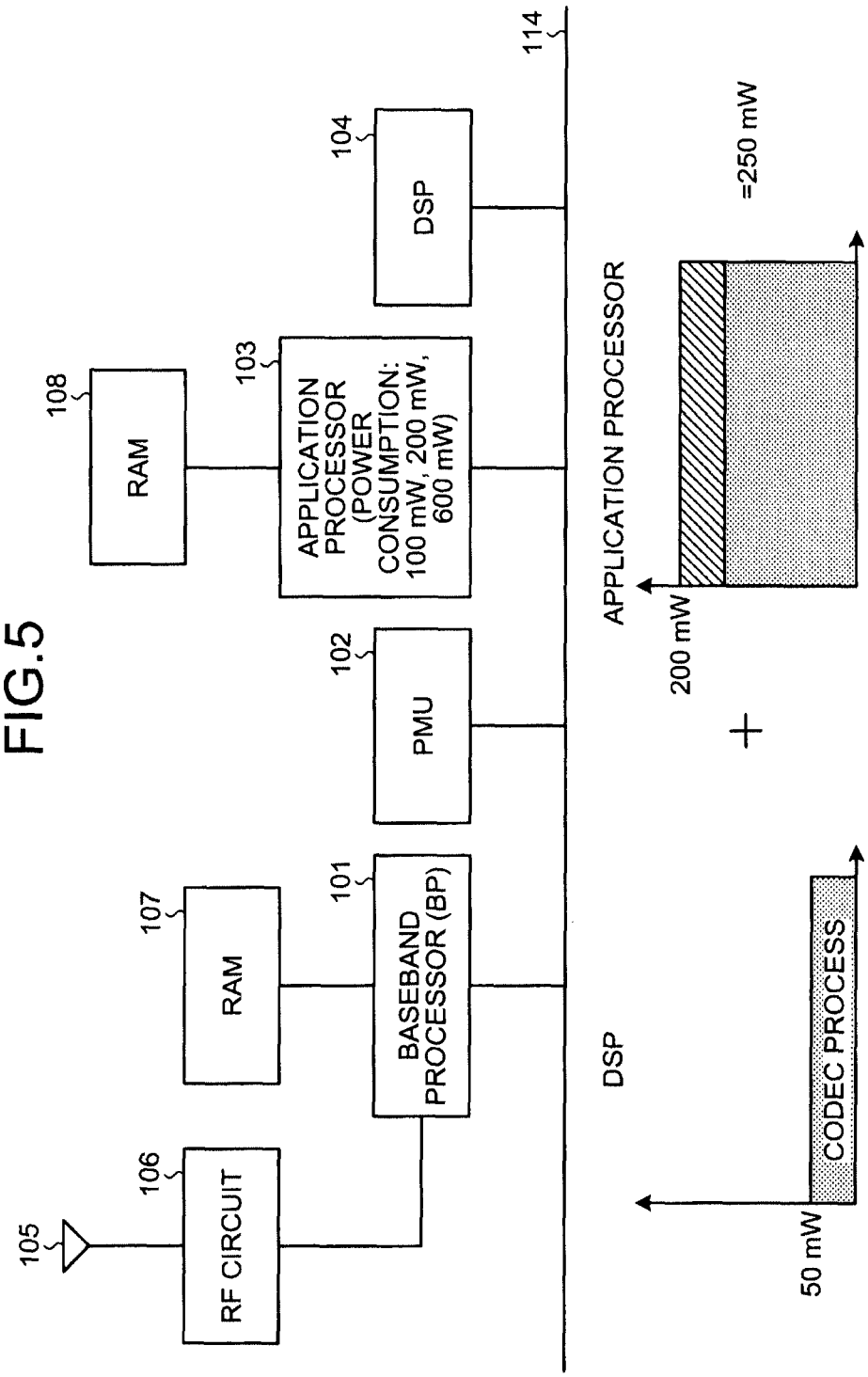
FIG. 5 is an explanatory diagram of the execution state and the power consumption of each CPU in a state 304 depicted in FIG. 3.

FIG. 5 is an explanatory diagram of the execution state and the power consumption of each of the CPUs in the state 304. When the state of the multi-core processor system 100 is the state 304, the BP 101, the APL 103, and the DSP 104 are executing respective processing. It is assumed that the APL 103 is operating using its second lowest clock gear. The sum of the power consumption of the DSP 104 and that of the APL 103 in the state 304 of the multi-core processor system 100 is 50+200=250 [mW].

Figure 6:
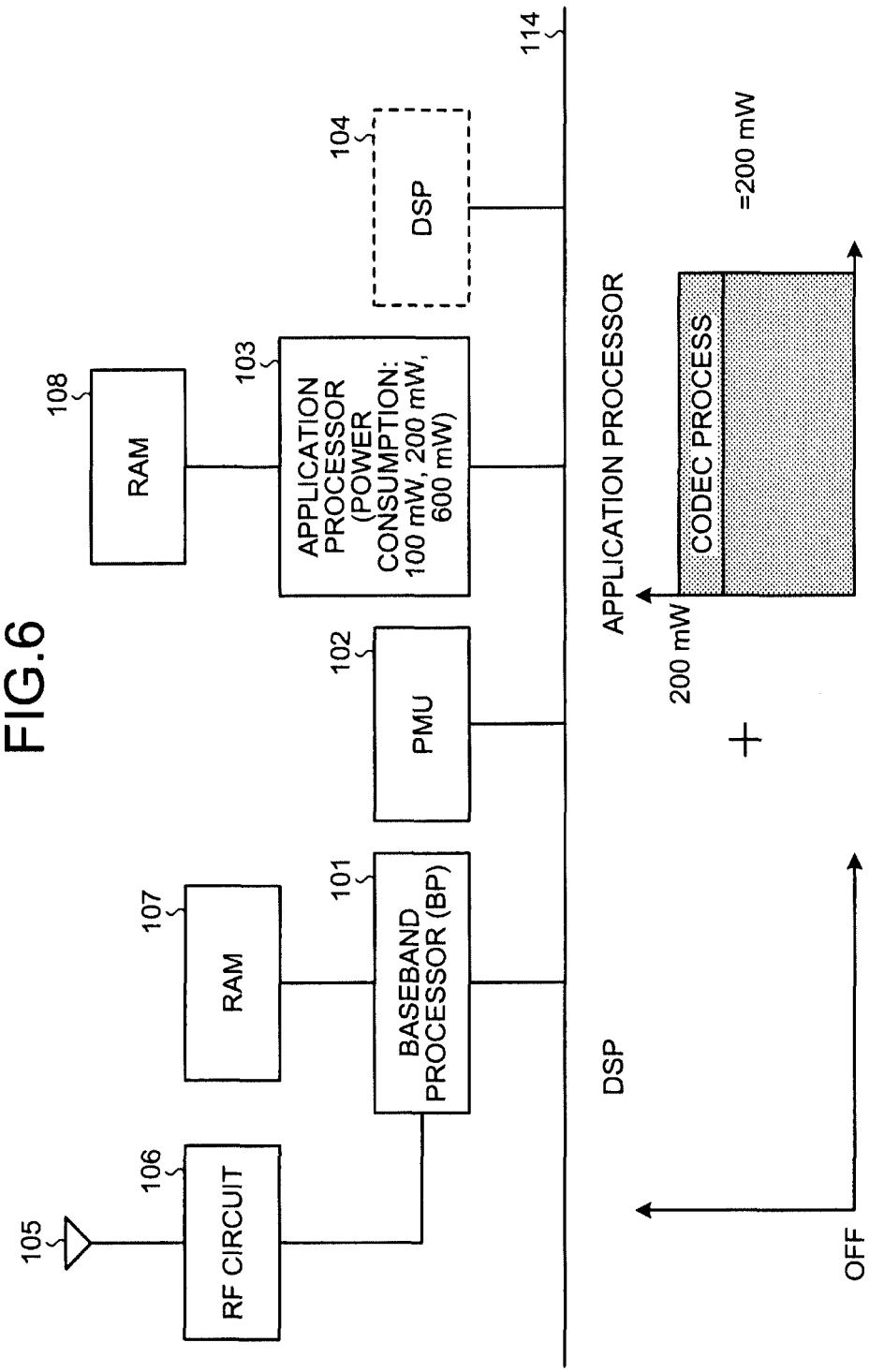
FIG. 6 is an explanatory diagram of the execution state and the power consumption of each CPU in a state 303 depicted in FIG. 3.

FIG. 6 is an explanatory diagram of the execution state and the power consumption of each of the CPUs in the state 303. When the state of the multi-core processor system 100 is the state 303, the BP 101 and the APL 103 are executing respective processing. The sum of the power consumption of the DSP 104 and that of the APL 103 in the state 303 of the multi-core processor system 100 is 0+200=200 [mW]. As described, comparing the states 304 and 303 with each other, the processes thereof are same for the multi-core processor system 100 to execute while the surplus of the computing capacity of the APL 103 is used for the codec process and therefore, more electrical power is saved in the state 303.

FIG. 7 is an explanatory diagram of an example of the content of the software capacity requirement table 201. This table has two fields including "software name" and "required computing capacity". The software name field stores therein the names of the software. The required computing capacity field stores therein the required computing capacities of the software.

A computing capacity of, for example, 100 [MIPS] is necessary for the "streaming reproduction" software to normally operate. Similarly, a computing capacity of, for example, 40 [MIPS] is necessary for the "sound reproduction" software to normally operate, and a computing capacity of, for example, 110 [MIPS] is necessary for "drawing map" software to normally operate. A computing capacity of, for example, 60 [MIPS] is necessary for "PCM codec" software to normally operate, that has the same function as that of the codec process executed by the DSP 104. The required computing capacities are measured in advance using a simulation before the execution or a profiler and the result acquired is set, as the specific setting method of the requirement values.

An example of execution of the multi-media processes by the APL 103 executed when the state of the multi-core processor system 100 transitions from the state 304 to the state 303 will be described with reference to FIG. 7. It is assumed that, for example, the power consumption of the APL 103 is 200 [mW] and the corresponding computing capacity is 200 [MIPS]. In this case, when the software executed by the APL 103 are the "streaming reproduction" software and the "sound reproduction" software, the sum of the required computing capacities of both of the software is 140 [MIPS]. The computing capacity of the APL 103 is 200 [MIPS] and its surplus computing capacity is 200−140=60 [MIPS] and therefore, the APL 103 is able to secure 60 [MIPS] for the "PCM codec" software to normally operate. In this case, it is determined that the surplus is present and therefore, the state of the multi-core processor system 100 transitions from the state 304 to the state 303.

It is assumed that the software executed by the APL 103 are the "drawing map" software and the "sound reproduction" software. The sum of the required computing capacities of both of the software is 110+40=150 [MIPS]. The surplus computing capacity thereof is 200−150=50 [MIPS] and therefore, the APL 103 is unable to secure 60 [MIPS] and therefore, is unable to cause the "PCM codec" software to normally operate. Therefore, the state of the multi-core processor system 100 maintains the state 304.

Figure 8A:
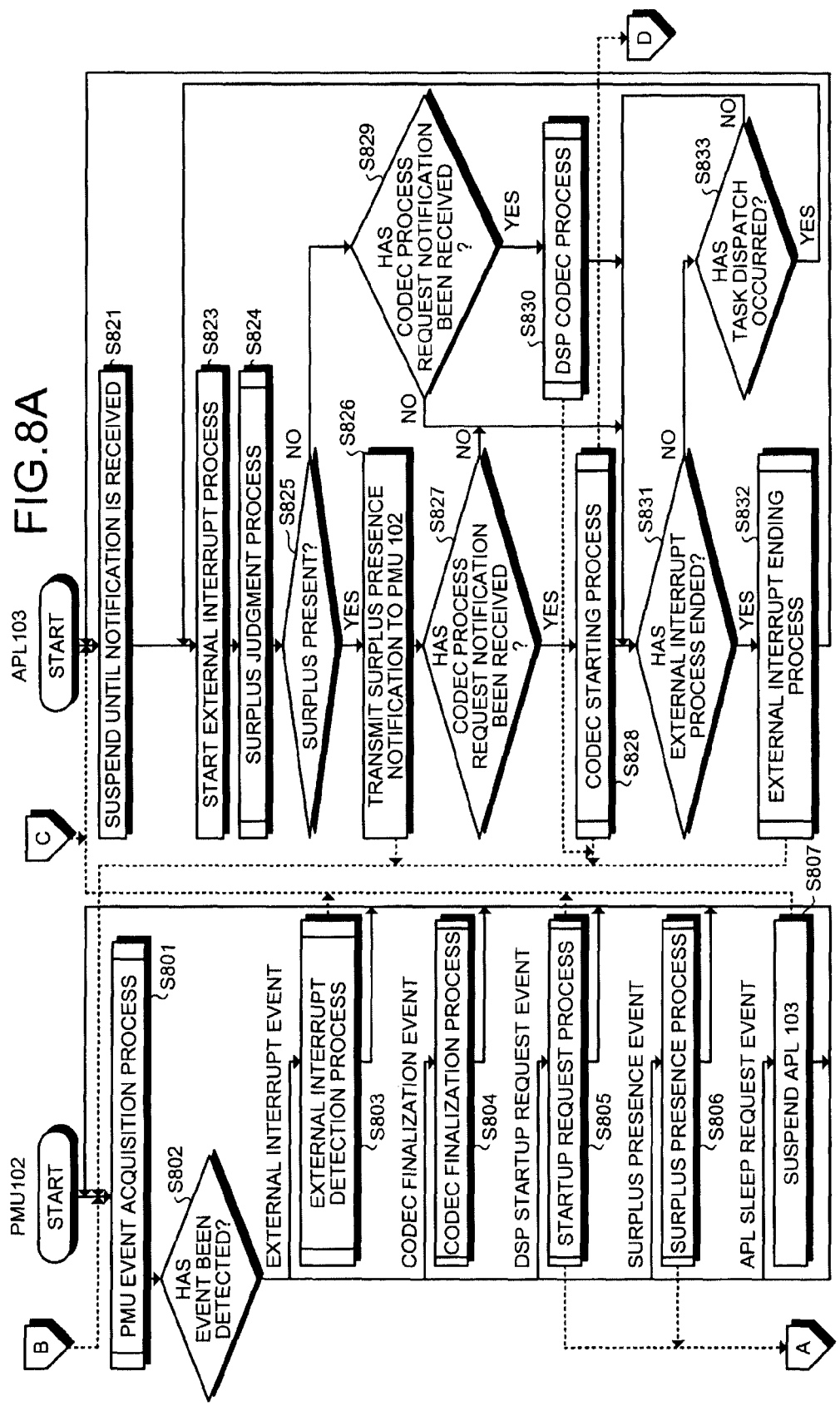
FIGS. 8A and 8B are flowcharts of scheduling processes of the multi-core processor system 100.
Figure 8B:
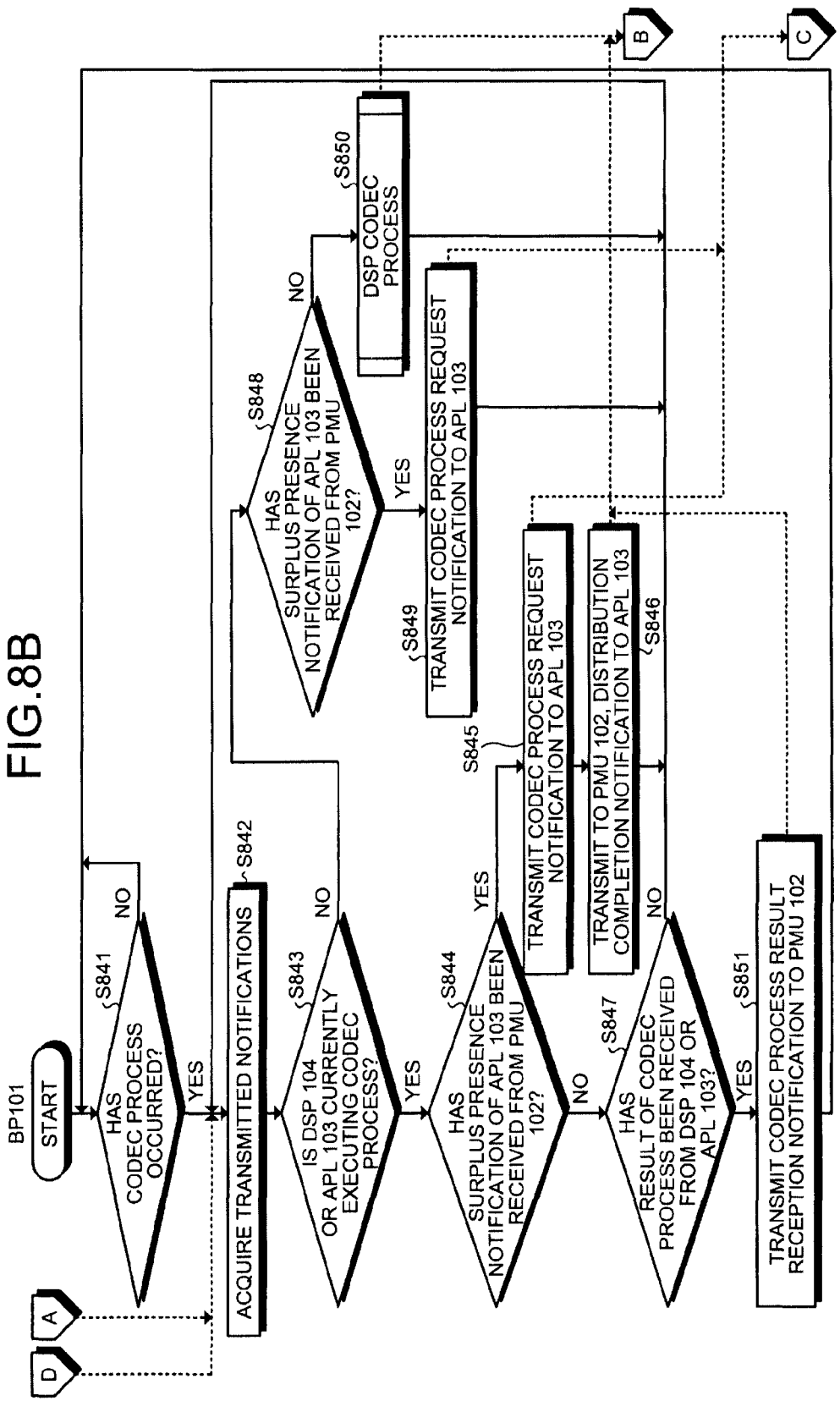

FIGS. 8A and 8B are flowcharts of scheduling processes of the multi-core processor system 100. FIG. 8A depicts the scheduling processes of the PMU 102 and the APL 103. FIG. 8B depicts the scheduling process of the BP 101.

When the PMU 102 receives notifications from processes at steps S826, S828, S830, S832, S846, S850, and S851 all described later, the PMU 102 executes a PMU event acquisition process (step S801). The details of the PMU event acquisition process will be described later with reference to FIG. 9. The PMU 102 branches the processing according to the event output by the PMU event acquisition process (step S802). If the event output is an "external interrupt event" (step S802: EXTERNAL INTERRUPT EVENT), the PMU 102 executes an external interrupt detection process (step S803). The details of the external interrupt detection process will be described later with reference to FIG. 10. In the process executed at step S803, the PMU 102 transmits an external interrupt notification to the APL 103 corresponding to the state of the APL 103. After executing the external interrupt detection process, the PMU 102 progresses to the process at step S801.

If the event output is a "codec finalization event" (step S802: CODEC FINALIZATION EVENT), the PMU 102 executes the codec finalization process (step S804). The details of the codec finalization process will be described later with reference to FIG. 11. After executing the codec finalization process, the PMU 102 progresses to the process at step S801. If the event output is a "DSP startup request event" (step S802: DSP STARTING-UP REQUEST EVENT), the PMU 102 executes a DSP startup request process (step S805). The details of the DSP startup request process will be described later with reference to FIG. 12. In the process executed at step S805, the PMU 102 transmits a DSP startup completion notification to the APL 103 or the BP 101 according to the request origin that executes the DSP startup request. After executing the DSP startup request process, the PMU 102 progresses to the process at step S801.

If the event output is a "surplus presence event" (step S802: SURPLUS PRESENCE EVENT), the PMU 102 executes a surplus presence process (step S806). The details of the surplus presence process will be described later with reference to FIG. 13. In the process executed at step S806, the PMU 102 transmits a surplus presence notification to the BP 101. After executing the surplus presence process, the PMU 102 progresses to the process at step S801. If the event output is an "APL sleep request event" (step S802: APL SLEEP REQUEST EVENT), the PMU 102 suspends the APL 103 (step S807). After executing these processes, the PMU 102 progresses to the process at step S801.

A flowchart for the APL 103 will be described. The APL 103 is suspended until the APL 103 receives a notification (step S821). For example, the PMU 102 discontinues the supply of the electrical power to the APL 103 and thereby, the PMU 102 suspends the APL 103, as a specific suspend method.

When the APL 103 receives a notification from the process executed at step S803, S805, or step S845 or S849 that will be described later, the APL 103 starts the external interrupt process (step S823). For example, the APL 103 executes the streaming reproduction software, the sound reproduction software, etc., as the multi-media processes that correspond to the external interrupt process.

After starting the external interrupt process, the APL 103 executes a surplus judgment process (step S824). The details of the surplus judgment process will be described later with reference to FIGS. 14, 15A, and 15B. Based on the result of the judgment, the APL 103 determines whether any surplus is present (step S825). If the APL 103 determines that a surplus is present (step S825: YES), the APL 103 transmits a surplus presence notification to the PMU 102 (step S826). After this transmission, the APL 103 determines whether the APL 103 has received any codec process request notification (step S827).

If the APL 103 determines that the APL 103 has received a codec process request notification (step S827: YES), the APL 103 executes the codec starting process (step S828). The details of the codec starting process will be described later with reference to FIG. 16. In the process executed at step S828, if the DSP 104 is in its suspended state, the APL 103 transmits a DSP startup request notification to the PMU 102. When the codec process comes to an end, the APL 103 notifies the BP 101 of the result of the codec process.

After the execution of the codec starting process, the APL 103 determines whether the external interrupt process has ended (step S831). If the APL 103 determines that the external interrupt process has ended (step S831: YES), the APL 103 executes the external interrupt ending process (step S832). The details of the external interrupt ending process will be described later with reference to FIG. 18. In the process executed at step S832, when the APL 103 transmits the surplus presence notification to the PMU 102, the APL 103 transmits a cancellation notification for the surplus presence to the APL 103.

After executing the external interrupt ending process, the APL 103 progresses to the process at step S821. If the APL 103 determines that the external interrupt process does not yet come to an end (step S831: NO), the APL 103 determines whether any task dispatch occurs (step S833). If the APL 103 determines that a task dispatch occurs (step S833: YES), the external interrupt process again occurs and therefore, the APL 103 progresses to the process at step S823. If the APL 103 determines that no task dispatch occurs (step S833: NO), the APL 103 progresses to the process at step S831.

If the APL 103 determines that no surplus is present (step S825: NO), the APL 103 determines whether the APL 103 has received any codec process request notification (step S829). If the APL 103 determines that the APL 103 has received a codec process request notification (step S829: YES), the APL 103 executes the DSP codec process (step S830). The details of the DSP codec process will be described later with reference to FIG. 17. In the process at step S830, when the DSP 104 is in a suspend state, the APL 103 transmits a DSP startup request notification to the PMU 102. After executing the DSP codec process, the APL 103 progresses to the process at step S831. If the APL 103 determines that the APL 103 has not received any codec process request notification (step S827: NO, step S829: NO), the APL 103 progresses to the process at step S831.

The scheduling process of the BP 101 will be described with reference to FIG. 8B. The BP 101 determines whether the codec process has occurred (step S841). If the BP 101 determines that the codec process has not occurred (step S841: NO), the BP 101 again executes the process executed at step S841 after a specific time period. If the BP 101 determines that the codec process has occurred (step S841: YES), the BP 101 receives notifications transmitted from the processes at steps S805, S806, and S828 (step S842). After receiving the notifications, the BP 101 determines whether the DSP 104 or the APL 103 is currently executing the codec process (step S843).

If the BP 101 determines that the DSP 104 or the APL 103 currently executes the codec process (step S843: YES), the BP 101 determines whether the BP 101 has received the surplus presence notification of the APL 103 from the PMU 102 (step S844). If the BP 101 determines that the BP 101 has not received the surplus presence notification (step S844: NO), the BP 101 determines whether the BP 101 has received the result of the codec process from the DSP 104 or the APL 103 (step S847). If the BP 101 determines that the BP 101 has received the result of the codec process (step S847: YES), the BP 101 transmits a codec process result reception notification to the PMU 102 (step S851). After this transmission, the BP 101 progresses to the process at step S841.

If the BP 101 determines that the BP 101 has not received the result of the codec process (step S847: NO), the BP 101 progresses to the process at step S842. If the BP 101 determines that the BP has received the surplus presence notification (step S844: YES), the BP 101 transmits the codec process request notification to the APL 103 (step S845). After this transmission, the BP 101 transmits a distribution completion notification to be transmitted to the APL 103, to the PMU 102 (step S846) and progresses to the process at step S842.

If the BP 101 determines that the DSP 104 and the APL 103 currently are not executing the codec process (step S843: NO), the BP 101 determines whether the BP 101 has received the surplus presence notification of the APL 103 from the PMU 102 (step S848). If the BP 101 determines that the BP 101 has received the surplus presence notification (step S848: YES), the BP 101 transmits the codec process request notification to the APL 103 (step S849) and progresses to the process at step S842. If the BP 101 determines that the BP 101 has not received the surplus presence notification (step S848: NO), the BP 101 executes the DSP codec process (step S850) and progresses to the process at step S842. In the process executed at step S850, when the DSP 104 is in a suspend state, the BP 101 transmits the DSP startup request notification to the PMU 102.

FIG. 9 is a flowchart of the PMU event acquisition process. The PMU 102 stands by until the PMU 102 receives an interrupt or a notification (step S901). The PMU 102 receives the interrupt or the notification (step S902) and determines whether the PMU 102 has received cancellation notification for the surplus presence (step S903). If the PMU 102 determines that the PMU 102 has received a cancellation notification for the surplus presence (step S903: YES), the PMU 102 deletes the surplus presence notification from a queue to store therein the notifications (step S904), and again progresses to the process at step S901.

If the PMU 102 determines that the PMU 102 has received a notification that is not a cancellation notification for the surplus presence (step S903: NO), the PMU 102 determines whether the PMU 102 has received an external interrupt (step S905). If the PMU 102 determines that the PMU 102 has received an external interrupt (step S905: YES), the PMU 102 outputs the external interrupt event (step S906) and causes the PMU event process to come to an end. If the PMU 102 determines that the PMU 102 has not received any external interrupt (step S905: NO), the PMU 102 determines whether the PMU 102 has received a codec process result reception notification from the BP 101 (step S907). If the PMU 102 determines that the PMU 102 has received a codec process result reception notification (step S907: YES), the PMU 102 outputs the codec finalization event (step S908) and causes the PMU event process to come to an end.

If the PMU 102 determines that the PMU 102 has not received a codec process result reception notification (step S907: NO), the PMU 102 determines whether the PMU 102 has received a DSP startup request notification (step S909). If the PMU 102 determines that the PMU 102 has received a DSP startup request notification (step S909: YES), the PMU 102 outputs the DSP startup request event (step S910) and causes the PMU event process to come to an end. If the PMU 102 determines that the PMU 102 as not received a DSP startup request notification (step S909: NO), the PMU 102 determines whether the PMU 102 has received a surplus presence notification (step S911). If the PMU 102 determines that the PMU 102 has received a surplus presence notification (step S911: YES), the PMU 102 outputs the surplus presence event (step S912) and causes the PMU event process to come to an end.

When the PMU 102 determines that the PMU 102 does not receive the surplus presence notification (step S911: NO), the PMU 102 determines whether the PMU 102 receives the sleep request notification from the APL 103 (step S913). When the PMU 102 determines that the PMU 102 has received the sleep request notification (step S913: YES), the PMU 102 outputs the APL sleep request event (step S914) and causes the PMU event process to come to an end. When the PMU 102 determines that the PMU 102 does not receive the APL sleep request notification (step S913: NO), the PMU 102 abolishes the notification received at step S902 and progresses to the process at step S901.

FIG. 10 is a flowchart of an external interrupt detection process. The PMU 102 determines whether the APL 103 is currently starting up (step S1001). If the PMU 102 determines that the APL 103 is not currently starting up (step S1001: NO), the PMU 102 causes the APL 103 to start up (step S1002). If the PMU 102 determines that the APL 103 is currently starting up (step S1001: YES) or after the process at step S1002, the PMU 102 transmits the external interrupt notification to the APL 103 (step S1003) and causes the external interrupt detection process to come to an end.

FIG. 11 is a flowchart of the codec finalization process. The PMU 102 determines whether the DSP 104 is currently starting up (step S1101). If the PMU 102 determines that the DSP 104 is currently starting up (step S1101: YES), the PMU 102 suspends the DSP 104 (step S1102) and causes the codec finalization process to come to an end. If the PMU 102 determines that the DSP 104 is not currently starting up (step S1101: NO), the PMU 102 also causes the codec finalization process to come to an end.

FIG. 12 is a flowchart of the DSP startup request process. The PMU 102 causes the DSP 104 to start up (step S1201). After causing the DSP 104 to start up, the PMU 102 determines whether the PMU 102 has received a DSP startup request notification from the APL 103 (step S1202). If the PMU 102 determines that the PMU 102 has received a DSP startup request notification from the APL 103 (step S1202: YES), the PMU 102 transmits the DSP startup completion notification to the APL 103 (step S1203). After the process at step S1203 or if the PMU 102 determines that the PMU 102 has not received a DSP startup request notification from the BP 101 (step S1202: NO), the PMU 102 transmits the DSP startup completion notification to the BP 101 (step S1204) and causes the DSP startup request process to come to an end.

FIG. 13 is a flowchart of the surplus presence process. The PMU 102 transmits the surplus presence notification to the BP 101 (step S1301). After this transmission, the PMU 102 determines whether the PMU 102 has received a distribution completion notification to the APL 103 from the BP 101 (step S1302). If the PMU 102 determines that the PMU 102 has not received a distribution completion notification (step S1302: NO), the PMU 102 again progresses to the process at step S1302 after a specific time period.

If the PMU 102 determines that the PMU 102 has received a distribution completion notification (step S1302: YES), the PMU 102 determines whether the DSP 104 is currently starting up (step S1303). If the PMU 102 determines that the DSP 104 is currently starting up (step S1303: YES), the PMU 102 suspends the DSP 104 (step S1304) and causes the surplus presence process to come to an end. If the PMU 102 determines that the DSP 104 is not currently starting up (step S1303: NO), the PMU 102 causes the surplus presence process to come to an end.

Figure 14:
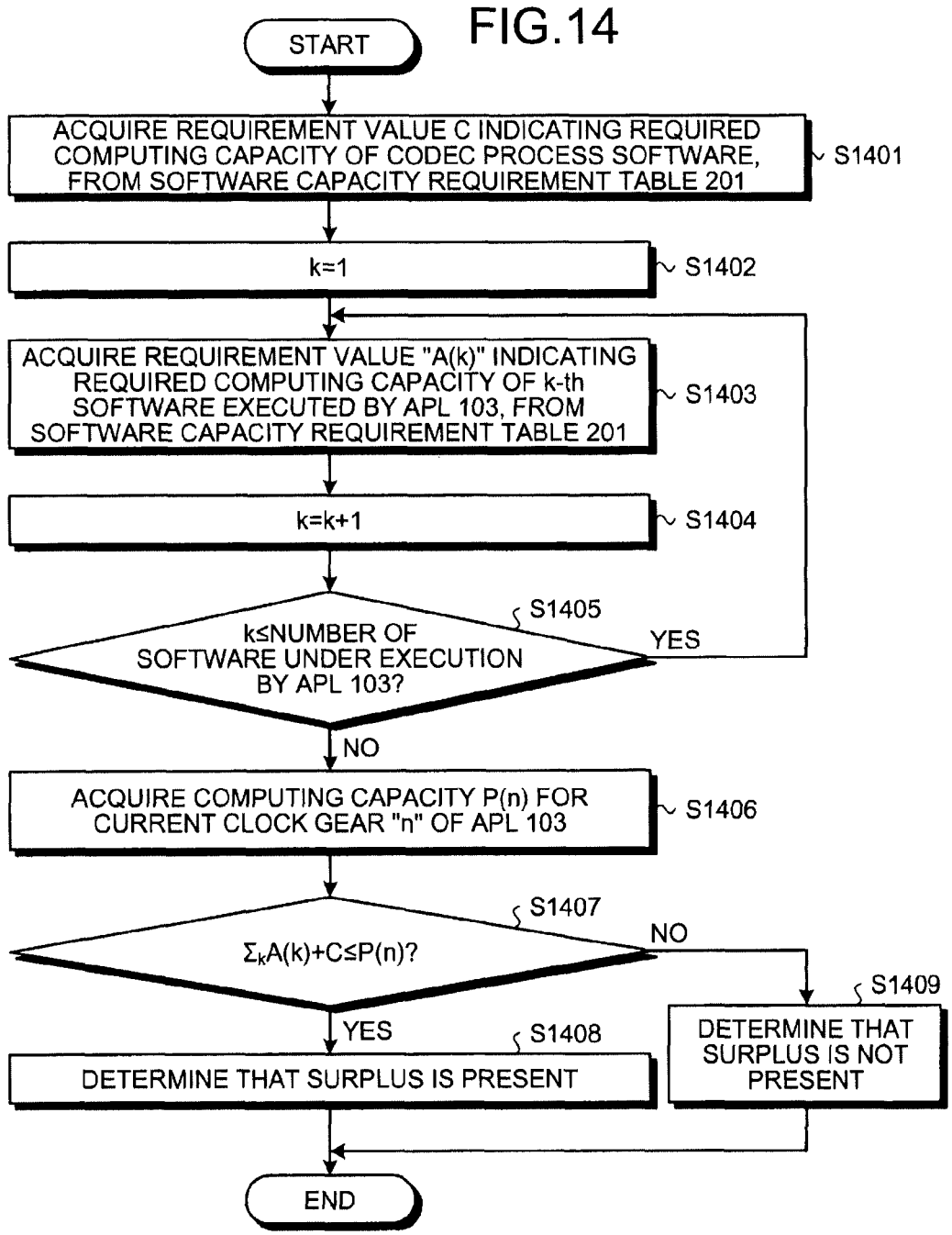
FIG. 14 is a flowchart of a surplus judgment process in a case where one APL 103 is present.

FIGS. 14, 15A, and 15B are flowcharts of the surplus judgment process. FIG. 14 depicts the flowchart for a case where the number of APL 103 is a singular number in the multi-core processor system 100. FIGS. 15A and 15B depict the flowcharts for a case where the number of APLs 103 is a plural number in the multi-core processor system 100.

FIG. 14 is a flowchart of the surplus judgment process in a case where one APL 103 is present. The APL 103 acquires a requirement value C indicating the required computing capacity of the codec process software, from the software capacity requirement table 201 (step S1401) and sets a variable "k" to be one (step S1402).

After this setting, the APL 103 acquires a requirement value "A(k)" indicating the required computing capacity of a k-th software executed by the APL 103, from the software capacity requirement table 201 (step S1403). After this acquisition, the APL 103 increments the variable k (step S1404) and determines if the variable k is equal to or lower than the number of software under execution by the APL 103 (step S1405). If the APL 103 determines that the variable k is equal to or lower than the number of software under execution (step S1405: YES), the APL 103 progresses to the process at step S1403.

If the APL 103 determines that the variable k exceeds the number of software under execution (step S1405: NO), the APL 103 acquires computing capacity P(n) for the current clock gear "n" of the APL 103 (step S1406). The APL 103 determines whether an inequality $\Sigma kA(k)+C \leq P(n)$ holds, using the values acquired at steps S1403 and S1406 (step S1407). If the APL 103 determines that the inequality holds (step S1407: YES), the APL 103 determines that a surplus is present (step S1408) and causes the surplus judgment process to come to an end. If the APL 103 determines that the inequality does not hold (step S1407: NO), the APL 103 determines that a surplus is not present (step S1409) and causes the surplus judgment process to come to an end.

FIGS. 15A and 15B are flowcharts of the surplus judgment process in a case where multiple APLs 103 are present. In FIGS. 15A and 15B, the APLs 103 includes M CPUs that are APL 103#1, APL 103#2, . . . , APL 103#M. When the APLs 103 are present, any one CPU of the APL 103#1 to APL 103#M executes the scheduling process executed by the APL 103. The flowchart of FIGS. 15A and 15B depicts a state where the APL 103#1 executes the scheduling process.

The APL 103#1 acquires the requirement value C indicating the required computing capacity of the codec process software, from the software capacity requirement table 201 (step S1501). After this acquisition, the APL 103#1 sets the variable "x" to be one (step S1502). After this setting, the APL 103#1 selects an x-th APL 103 (step S1503). After this selection, the APL 103#1 sets the variable k to be one (step S1504). After this setting, the APL 103#1 acquires a requirement value Ax(k) indicating the required computing capacity of the k-th software executed by the APL 103#x, from the software capacity requirement table 201 (step S1505).

After this acquisition, the APL 103#1 increments the variable k (step S1506) and determines if the variable k is equal to or lower than the number of software under execution by the APL 103#x (step S1507). If the APL 103#1 determines that the variable k is equal to or lower than the number of software under execution (step S1507: YES), the APL 103#1 progresses to the process at step S1505. If the APL 103#1 determines that the variable k exceeds the number of software under execution (step S1507: NO), the APL 103#1 acquires computing capacity Px(nx) for the current clock gear nx of the APL 103#x (step S1508). After this acquisition, the APL 103#1 increments the variable x (step S1509) and determines if the variable x is equal to or lower than the number of APLs (step S1510). If the APL 103#1 determines that the variable x is equal to or lower than the number of APLs (step S1510: YES), the APL 103#1 progresses to the process at step S1503.

If the APL 103#1 determines that the variable x is not equal to or lower than the number of APLs (step S1510: NO), the APL 103#1 determines whether an inequality $\Sigma x \Sigma k Ax(k)+C \leq \Sigma x Px(nx)$ holds (step S1511). If the APL 103#1 determines that the inequality does not hold (step S1511: NO), the APL 103#1 judges that the no surplus is present (step S1520) and causes the surplus judgment process to come to an end. If the APL 103#1 determines that the inequality holds (step S1511: YES), the APL 103#1 sets the variable x to be one (step S1512).

The APL 103#1 calculates the surplus computing capacity S(x) after the assignment of the codec to the APL 103#x as $S(x)=Px(nx)-\{\Sigma k Ax(k)+C\}$ (step S1513). After this calculation, the APL 103#1 increments the variable x (step S1514) and determines if the variable x is equal to or lower than the number of APLs 103 (step S1515). If the APL 103#1 determines that the variable x is equal to or lower than the number of APLs 103 (step S1515: YES), the APL 103#1 progresses to the process at step S1513.

If the APL 103#1 determines that the variable x is not equal to or lower than the number of APLs 103 (step S1515: NO), the APL 103#1 determines if "Max(S(x))" is equal to or larger than zero (step S1516). When the APL 103#1 determines that "Max(S(x))" is equal to or larger than zero (step S1516: YES), the APL 103#1 judges that the APL 103#x having Max(S(x)) is a CPU whose computing capacity has a surplus (step S1519) and causes the surplus judgment process to come to an end. If the APL 103#1 determines that "Max(S(x))" is less than zero (step S1516: NO), the APL 103#1 to 103#M execute rescheduling or migration of the software using the APL 103#1 to 103#M (step S1517).

As a result of the process at step S1517, the APL 103#1 determines whether the APL 103#x whose Max(S(x)) is Max (S(x))≥0 is present among the APL 103#1 to 103#M (step S1518). If the APL 103#1 determines that the APL 103#x is present (step S1518: YES), the APL 103#1 progresses to a process at step S1519. If the APL 103#1 determines that the APL 103#x is not present (step S1518: NO), the APL 103#1 progresses to a process at step S1520.

The rescheduling or the migration that is the processes at step S1517 is executed such that the surplus computing capacity S(x) of each of the APLs 103#1 to 103#M exceeds the requirement value C of the computing capacity of the codec process software. A specific example of the migration will be described below. For example, it is assumed that two APLs are present that are the APLs 103#1 and 103#2; and the computing capacity of the APL 103#1 is 100 [MIPS] and that of the APL 103#2 is 200 [MIPS] based on the clock gears of these APLs.

It is also assumed that two software (software A and B) are executed by the APL 103#1; the required computing capacities of the software are 60 and 20 [MIPS]; two software (software C and D) are also executed by the APL 103#2; the required computing capacities of these software are 140 and 20 [MIPS]; and the requirement value C of the computing capacity of the codec process software is 60 [MIPS].

In this case, the inequality at step S1511 gives (60+20)+(140+20)+60≤100+200; therefore, the APL 103#1 processes following the route of "step S1511: YES"; at step S1516, the determination gives S(1)=−40 and S(2)=−20; and the APL 103#1 processes following the route of "step S1517: NO".

In the process at step S1517, the APLs 103#1 and 103#2 migrate the software D under execution by the APL 103#2 as the software to be migrated, to the APL 103#1 and thereby, S(2) is S(2)=0, and the APL 103#1 processes following the route of "step S1518: YES". In this manner, the APLs 103#1 and 103#2 execute the rescheduling or the migration such that the computing capacity of the APLs 103#1 and 103#2 exceeds the requirement value C of the computing capacity of the codec process software. A flowchart of an example of a process of searching the software that is to be migrated will be described with reference to FIG. 19.

Figure 16:
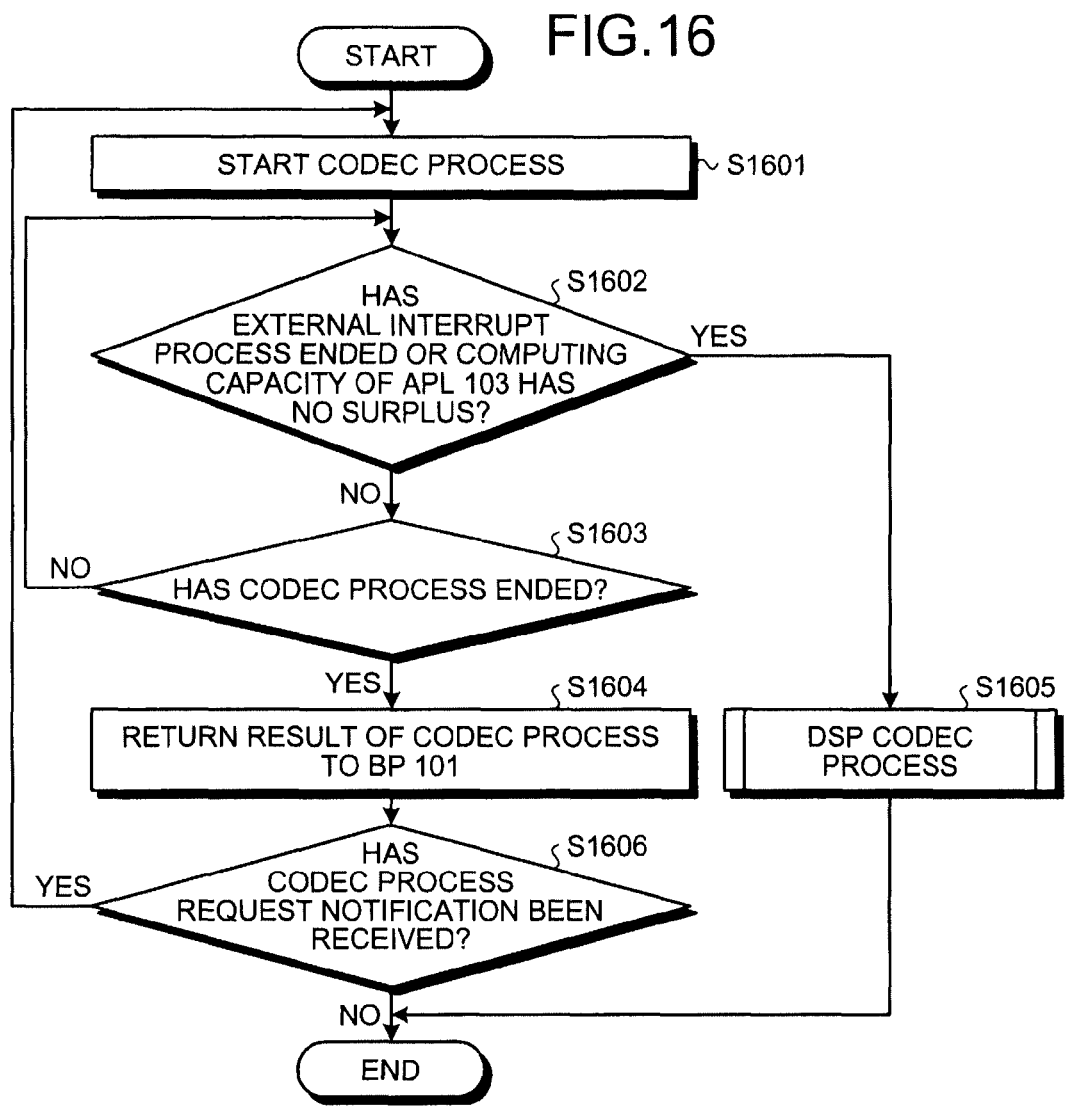
FIG. 16 is a flowchart of a codec starting process.

FIG. 16 is a flowchart of the codec starting process. The APL 103 starts the codec process (step S1601). During the codec process, the APL 103 determines if the external interrupt process has ended or if the computing capacity of the APL 103 has no surplus (step S1602). If the APL 103 determines that the external interrupt process has not yet come to an end and that the computing capacity of the APL 103 has a surplus (step S1602: NO), the APL 103 determines whether the codec process has ended (step S1603). If the APL 103 determines that the codec process has not yet come to an end (step S1603: NO), the APL 103 progresses to the process at step S1602.

If the APL 103 determines that the codec process has come to an end (step S1603: YES), the APL 103 returns the result of the codec process to the BP 101 (step S1604). After returning the result, the APL 103 determines whether the APL 103 has received the codec process request notification (step S1606). If the APL 103 determines that the APL 103 has not received the codec process request notification (step S1606: NO), the APL 103 causes the codec starting process to come to an end.

If the APL 103 determines that the APL 103 has received the codec process request notification (step S1606: YES), the APL 103 progresses to the process at step S1601. If the APL 103 determines that the external interrupt process has ended or that the computing capacity of the APL 103 has no surplus (step S1602: YES), the APL 103 executes the DSP codec process (step S1605) and causes the codec starting process to come to an end.

FIG. 17 is a flowchart of the DSP codec process. The DSP codec process is executed by the BP 101 or the APL 103. In the example of FIG. 17, it is assumed that the DSP codec process is executed by the BP 101.

The BP 101 transmits the DSP startup request notification to the PMU 102 (step S1701). After transmitting the DSP startup request notification, the BP 101 determines whether the BP 101 has received a DSP startup completion notification from the PMU 102 (step S1702). If the BP 101 determines that the BP 101 has not yet received a DSP startup completion notification (step S1702: NO), the BP 101 again progresses to the process at step S1702 after a specific time period.

If the BP 101 determines that the BP 101 has received a DSP startup completion notification (step S1702: YES), the BP 101 determines whether the APL 103 has executed the codec process (step S1703). If the BP 101 determines that the APL 103 has executed the codec process (step S1703: YES), the BP 101 migrates the codec process from the APL 103 to the DSP 104 (step S1704) and causes the DSP codec process to come to an end. If the BP 101 determines that the APL 103 has not executed the codec process (step S1703: NO), the BP 101 distributes the codec process to the DSP 104 (step S1705) and causes the DSP codec process to come to an end.

FIG. 18 is a flowchart of the external interrupt ending process. The APL 103 determines whether the APL 103 has transmitted a surplus presence notification to the PMU 102 (step S1801). If the APL 103 determines that the APL 103 has transmitted a surplus presence notification (step S1801: YES), the APL 103 transmits a cancellation notification for the surplus presence to the PMU 102 (step S1802). If the APL 103 determines that the APL 103 has not yet transmitted a surplus presence notification (step S1801: NO) or after the process at step S1802 comes to an end, the APL 103 transmits an APL sleep request to the PMU 102 (step S1803) and causes the external interrupt ending process to come to an end.

If the APL 103 transmits a cancellation notification for the surplus presence, the APL 103 may store the cancellation notification for the surplus presence at the head of the queue to store therein the notifications of the PMU 102. Thereby, when the PMU 102 receives the notification at step S902, the PMU 102 is able to receive the cancellation notification for the surplus presence before receiving the surplus presence notification and is able to delete the surplus presence notification.

FIG. 19 is a flowchart of an example of the process of searching the software to be migrated, that is to be migrated at step S1517. The APL 103#1 sets the variable x to be one (step S1901) and also sets the variable k to be one (step S1902). After this setting, the APL 103#1 calculates "S(x)+A(k)" for the k-th software of the APL 103#x (step S1903).

After this calculation, the APL 103#1 increments the variable k (step S1904) and determines if the variable k is equal to or lower than the number of software under execution (step S1905). If the APL 103#1 determines that the variable k is equal to or lower than the number of software under execution (step S1905: YES), the APL 103#1 progresses to the process at step S1903. If the APL 103#1 determines that the variable k exceeds the number of software under execution (step S1905: NO), the APL 103#1 increments the variable x (step S1906) and determines if the variable x is equal to or lower than the number of APLs (step S1907). If the APL 103#1 determines that the variable x is equal to or lower than the number of APLs (step S1907: YES), the APL 103#1 progresses to the process at step S1902.

If the APL 103#1 determines that the variable x is larger than the number of APLs (step S1907: NO), the APL 103#1 sets "x1" and "k1" to be x and k that satisfy S(x)+A(k)≥0 and that give the minimum value of S(x)+A(k), among the calculated values of S(x)+A(k) (step S1908). The APL 103#x1 is the CPU to be the migrating origin and the k1-th software of the APL 103 #x1 is the software to be migrated. When no x1 and no k1 are present that satisfy S(x1)+A(k1)≥0, the APL 103#1 sets no value. However, "S(x1)+A(k1)≥0" is able to be deformed as follows.

$$S(x1)+A(k1)\geq 0$$

$$\Leftrightarrow Px(nx1)-\{\Sigma_k Ax(k)+C\}+A(k1)\geq 0$$

$$\Leftrightarrow Px(nx1)\geq \{\Sigma_k Ax(k)-A(k1)\}+C$$

"{ΣkAx(k)−A(k1)}+C" expresses the sum of the required computing capacities of the software remaining after excluding the software to be migrated and the codec process. Therefore, satisfying "S(x1)+A(k1)≥0 is equivalent to that the above sum is equal to or lower than the computing capacity value of the APL 103#x1.

The APL 103#1 determines whether any values have been set for x1 and k1 (step S1909). If the APL 103#1 determines that no values have been set for x1 and k1 (step S1909: NO), the APL 103#1 outputs the result that no software to be migrated is found (step S1916) and causes the process of searching the software to be migrated to come to an end. If the APL 103#1 determines that values have been set (step S1909: YES), the APL 103#1 sets the variable x to be one (step S1910).

After this setting, the APL 103#1 determines if the variable x is equal to or smaller than the number of APLs (step S1911). If the APL 103#1 determines that the variable x is larger than the number of APLs (step S1911: NO), the APL 103#1 progresses to a process at step S1916. If the APL 103#1 determines that the variable x is equal to or smaller than the number of APLs (step S1911: YES), the APL 103#1 determines whether the variables x and x1 are equal to each other (step S1912). If the APL 103#1 determines that the variables x and x1 are equal to each other (step S1912: YES), the APL 103#1 increments the variable x (step S1914) and progresses to the process at step S1911.

If the APL 103#1 determines that the variables x and x1 are not equal to each other (step S1912: NO), the APL 103#1 determines whether an equality Px(nx)−ΣkA(k)−A(k1)≥0 holds (step S1913). If the APL 103#1 determines that the equality does not hold (step S1913: NO), the APL 103#1 progresses to the process at step S1914. If the APL 103#1 determines that the equality holds (step S1913: YES), the APL 103#1 outputs a report reporting that the APL 103#1 is the CPU to be the migrating origin, the k1-th software of the APL 103#x1 is the software to be migrated, and the APL 103#x is the CPU to be the migrating destination (step S1915). After this outputting, the APL 103#1 causes the process of searching the software to be migrated to come to an end.

A case where the software to be migrated is one, is taken as an example in the example of FIG. 19. However, a plural software may be the software to be migrated and a surplus corresponding to the requirement value C of the computing capacity of the codec process software may be generated in the computing capacity of the APL to be the migrating origin.

As described, according to the multi-core processor system, the electrical power control method, and the electrical power control program, it is determined whether the sum of the computing capacity of the specific software having the function executed by the specific core and the computing capacity of the other software under execution by the other core is equal to or lower than the computing capacity of the other core. If it is determined that the sum is equal to or lower than the computing capacity, the multi-core processor system assigns the specific software to the other core and suspends the specific core. Thereby, the multi-core processor system is able to effectively utilize the surplus of the computing capacity generated in the other core and is able to facilitate saving of the electrical power by the amount used by the specific core.

The multi-core processor system may assign the specific software to the core whose computing capacity has the largest surplus of the other cores. Thereby, the multi-core processor system is able to facilitate the saving of the electrical power of the specific core, and is further able to assign the specific software such that the loads on the other cores substantially become even.

The multi-core processor system may migrate the software to be migrated that is under execution by the core to be the migrating origin, to the core to be the migrating destination, and may assign the specific software to the core to be the migrating origin. Thereby, even when the surplus of the computing capacity of each of the other cores does not reach the required computing capacity of the specific software, the multi-core processor system aggregates the surpluses of the computing capacity into one core, thereby, is able to execute the specific software using the one core, and is able to facilitate saving of electrical power.

When the sum of the required computing capacities of the specific software and those of the software under execution by the other cores is equal to or lower than the sum of the computing capacity values of the other cores, the multi-core processor system may migrate the software to be migrated. Thereby, before aggregating the surpluses of the computing capacity, the multi-core processor system is able to determine whether any one of the other cores is able to execute the specific software, and does not need to execute any wasteful migrating process.

The electrical power control method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to the multi-core processor system, the electrical power control method, and the electrical power control program, an effect is achieved that the surplus of the computing capacity is able to be reduced and thereby, the electrical power is able to be saved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core processor system comprising a core configured to:
   detect that among second cores different from a first core executing a first software, a second software having a function different from the first software is under execution;
   extract, from a database storing required computing capacities respectively corresponding to each of the plural software and upon detecting that a second software is under execution, requirement values indicating the required computing capacity of the first software and of each second software;
   judge for each of the second cores, whether a sum of the required computing capacity of the first software and of the second software that is under execution by the second core is at most a computing capacity value of the second core;
   assign the first software to a second core for which the sum of the required computing capacities is judged to be at most the computing capacity value;
   suspend the first core, upon assigning the first software to the second core; and
   determine among the second cores for which the sum of the required computing capacities is judged to be at most the computing capacity value, a third core for which a difference of the computer capacity value of the third core and the sum of the required computing capacities of the first software and the second software is greatest, wherein
   the core assigns the first software to the third core, and
   the core, upon assigning the first software to the third core, suspends the first core.

2. The multi-core processor system according to claim 1, the core configured to migrate to a migrating destination core among the second cores, software that is to be migrated and is under execution by a migrating origin core among the second cores, wherein
   the core judges whether the sum of the required computing capacities of the first software and of the plural software remaining after excluding the software to be migrated is at most a computing capacity value of the migrating origin core,
   the core, upon judging that the sum is at most the computing capacity value of the migrating origin core, migrates to the migrating destination core, the software to be migrated from the migrating origin core, and
   the core, after migrating the software to be migrated, assigns the first software to the migrating origin core.

3. The multi-core processor system according to claim 2, wherein
   the core judges whether the sum of the required computing capacity of the first software and of each software under execution by each of the second cores is at most the sum of the computing capacity values of the second cores, and the sum of the required computing capacity of the first software and of the plural software remaining after excluding the software to be migrated is at most the computing capacity value of the migrating origin core.

4. An electrical power control method executed by a core, the electrical power control method comprising:
   detecting that among second cores different from a first core executing a first software, a second software having a function different from the first software is under execution;
   extracting, from a database storing required computing capacities respectively corresponding to each of the plural software and upon detecting that a second software is under execution, requirement values indicating the required computing capacity of the first software and of each second software;
   judging for each of the second cores, whether a sum of the required computing capacity of the first software and of the second software that is under execution by the second core is at most a computing capacity value of the second core;

assigning the first software to a second core for which the sum of the required computing capacities is judged to be at most the computing capacity value;

suspending the first core, upon assigning the first software to the second core; and determining among the second cores for which the sum of the required computing capacities is judged to be at most the computing capacity value, a third core for which a difference of the computer capacity value of the third core and the sum of the required computing capacities of the first software and the second software is greatest, wherein the core assigns the first software to the third core, and the core, upon assigning the first software to the third core, suspends the first core.

5. A non-transitory computer-readable recording medium storing a program causing a core to execute an electrical power control process comprising:

detecting that among second cores different from a first core executing a first software, a second software having a function different from the first software is under execution;

extracting, from a database storing required computing capacities respectively corresponding to each of the plural software and upon detecting that a second software is under execution, requirement values indicating the required computing capacity of the first software and of each second software;

judging for each of the second cores, whether a sum of the required computing capacity of the first software and of the second software that is under execution by the second core is at most a computing capacity value of the second core;

assigning the first software to a second core for which the sum of the required computing capacities is judged to be at most the computing capacity value;

suspending the first core, upon assigning the first software to the second core; and determining among the second cores for which the sum of the required computing capacities is judged to be at most the computing capacity value, a third core for which a difference of the computer capacity value of the third core and the sum of the required computing capacities of the first software and the second software is greatest, wherein the core assigns the first software to the third core, and the core, upon assigning the first software to the third core, suspends the first core.

* * * * *